United States Patent
Ikeda

(10) Patent No.: US 10,628,094 B2
(45) Date of Patent: Apr. 21, 2020

(54) SYSTEM AND METHOD FOR WIRELESS COMMUNICATION BETWEEN TWO DEVICES

(71) Applicant: SEIKO EPSON CORPORATION, Tokyo (JP)

(72) Inventor: Iwane Ikeda, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/285,550

(22) Filed: Feb. 26, 2019

(65) Prior Publication Data
US 2019/0265922 A1 Aug. 29, 2019

(30) Foreign Application Priority Data
Feb. 27, 2018 (JP) ................. 2018-032857

(51) Int. Cl.
| | | |
|---|---|---|
| G06F 15/00 | (2006.01) | |
| G06F 3/12 | (2006.01) | |
| G06K 1/00 | (2006.01) | |
| H04M 1/725 | (2006.01) | |
| H04N 1/00 | (2006.01) | |

(52) U.S. Cl.
CPC .......... *G06F 3/1236* (2013.01); *G06F 3/1204* (2013.01); *G06F 3/1226* (2013.01); *G06F 3/1292* (2013.01); *H04M 1/7253* (2013.01); *H04M 1/72533* (2013.01); *H04N 1/00477* (2013.01)

(58) Field of Classification Search
CPC .... G06F 3/1236; G06F 3/1204; G06F 3/1226; G06F 3/1292; H04M 1/7253; H04M 1/72533; H04N 1/00477
USPC ....................... 358/1.15, 1.1, 1.14
See application file for complete search history.

(56) References Cited

U.S. PATENT DOCUMENTS

| | | | |
|---|---|---|---|
| 2016/0286343 A1 | 9/2016 | Terashita et al. | |
| 2018/0084131 A1* | 3/2018 | Hashimoto | ........... G06F 1/1613 |
| 2018/0097302 A1* | 4/2018 | Takahashi | ............ H01R 13/567 |

FOREIGN PATENT DOCUMENTS

JP    2016-187089 A    10/2016

* cited by examiner

*Primary Examiner* — Douglas Q Tran
(74) *Attorney, Agent, or Firm* — Workman Nydegger

(57) ABSTRACT

A terminal apparatus includes a first wireless communication interface that performs wireless communication with an electronic apparatus using a first wireless communication scheme, a second wireless communication interface that performs wireless communication with the electronic apparatus using a second wireless communication scheme, and a processor. The processor determines whether or not a designation electronic apparatus that is a target which performs a job in compliance with the first wireless communication scheme is present, based on a result of the wireless communication with the designation electronic apparatus in compliance with the second wireless communication scheme, and, in a case where the designation electronic apparatus is not present, performs processing that displays a screen for the absence, on a display unit.

13 Claims, 15 Drawing Sheets

FIG. 7

| NAME | IDENTIFICATION INFORMATION | CAPABILITY |
|---|---|---|
| PRINTER 1 | MAC ADDRESS 1 | Capability1 |
| PRINTER 2 | MAC ADDRESS 2 | Capability2 |
| PRINTER 4 | MAC ADDRESS 4 | Capability4 |
| PRINTER 5 | MAC ADDRESS 5 | Capability5 |

FIG. 9

| BEACON IDENTIFIER | IDENTIFICATION INFORMATION ON ELECTRONIC APPARATUS (MAC ADDRESS) | STATUS INFORMATION ON ELECTRONIC APPARATUS |
|---|---|---|

SYSTEM AND METHOD FOR WIRELESS COMMUNICATION BETWEEN TWO DEVICES

BACKGROUND

1. Technical Field

The present invention relates to a terminal apparatus, a communication system, a computer-readable recording medium, and a display control method.

2. Related Art

In the related art, terminal apparatuses each of which performs communication with an electronic apparatus using a wireless communication scheme such as a wireless LAN are known. The wireless LAN, for example, is for communication that complies with Wi-Fi (a registered trademark) standards. As this terminal apparatus, a smartphone or the like is considered that transmits print data to an electronic apparatus that is a printer, through wireless communication which complies with Wi-Fi standards.

Furthermore, a technique is also known that uses wireless communication in compliance with a different wireless communication scheme when a connection in compliance with a given wireless communication scheme is established. In JP-A-2016-187089, a technique is disclosed in which a connection between a portable terminal and a printer switches to Wi-Fi based on information that is acquired with Bluetooth Low Energy (BLE) (Bluetooth is a registered trademark).

In terminal apparatus in the related art, in some cases, for a reduction in power consumption or the like, Wi-Fi is usually set to be OFF, and, only when necessary, Wi-Fi is set to be ON. For example, when print data is transmitted to a printer, Wi-Fi that enables high-speed communication compared with BLE is set to be ON, and in other states, Wi-Fi is set to be OFF.

In this case, in a state where Wi-Fi is OFF, print data is created with an application of the terminal apparatus, and when printing is performed, an attempt is made to make a Wi-Fi connection to a given printer. The given printer, for example, is a printer that has been connected in the past. However, in a case where the terminal apparatus and the printer are at a distance from each other, or where the printer is not powered on, a Wi-Fi connection is not established. A user of the terminal apparatus is caused to wait until timeout of the connection attempt occurs and thus the efficiency of the user's working decreases.

SUMMARY

An advantage of some aspects of the invention is to provide a terminal apparatus, a communication system, a computer-readable recording medium, a display control method, and the like that suppress the working efficiency from decreasing due to an unnecessary connection attempt.

According to an aspect of the invention, there is provided a terminal apparatus including: a first wireless communication unit that performs wireless communication with an electronic apparatus using a first wireless communication scheme; a second wireless communication unit that performs wireless communication with the electronic apparatus using a second wireless communication scheme that is different from the first wireless communication scheme; and a processing unit that performs communication control of the first wireless communication unit and the second wireless communication unit, in which the processing unit determines whether or not a designation electronic apparatus that is a target which performs a job in compliance with the first wireless communication scheme is present, based on a result of the wireless communication with the designation electronic apparatus in compliance with the second wireless communication scheme, and, in a case where the designation electronic apparatus is not present, performs processing that displays a screen for the absence, on a display unit.

Furthermore, in the terminal apparatus, in a case where the designation electronic apparatus is present, the processing unit may perform processing that displays a screen for an instruction for performing a job, on the display unit and, in the case where the designation electronic apparatus is not present, the processing unit may perform processing that displays the screen for the absence on the display unit, instead of the screen for an instruction for performing a job.

Furthermore, in the terminal apparatus, an object for performing a job may be displayed on the screen for an instruction for performing a job, and the screen for the absence may be a screen that results from changing a mode for displaying the object on the screen for an instruction for performing a job.

Furthermore, in the terminal apparatus, in a case where an operation of performing a job is detected, if the designation electronic apparatus is present, the processing unit may instruct the designation electronic apparatus to perform a job, using the first wireless communication scheme, and, in the case where the operation of performing a job is detected, if the designation electronic apparatus is not present, the processing unit may perform processing that displays the screen for the absence on the display unit.

Furthermore, in the terminal apparatus, the screen for the absence may be a message screen that notifies the absence of the designation electronic apparatus.

Furthermore, in the terminal apparatus, the screen for the absence may be a message screen that notifies the presence of any other electronic apparatus that possibly performs a job.

Furthermore, in the terminal apparatus, based on a beacon signal in compliance with the second wireless communication scheme, the processing unit may determine whether or not the designation electronic apparatus is present.

Furthermore, in the terminal apparatus, the processing unit may determine whether or not the designation electronic apparatus is present, based on a result of processing that compares identification information on the designation electronic apparatus, which is acquired using the first wireless communication scheme, and identification information that is included in the beacon signal in compliance with the second wireless communication scheme.

Furthermore, in the terminal apparatus, the processing unit may receive status information on the designation electronic apparatus, based on the beacon signal in compliance with the second wireless communication scheme, and may perform processing that displays a screen which notifies that the designation electronic apparatus is in a given status, on the display unit, based on the status information.

Furthermore, in the terminal apparatus, the given status may be at least one status of an error status and a status of a job that waits to be performed.

Furthermore, according to another aspect of the invention, there is provided a communication system including: any terminal apparatus described above; and the electronic apparatus.

Furthermore, according to still another aspect of the invention, there is provided a computer-readable recording medium on which a program is recorded, the program that causing a computer to function as: a first wireless communication unit that performs wireless communication with an electronic apparatus using a first wireless communication scheme; a second wireless communication unit that performs wireless communication with the electronic apparatus using a second wireless communication scheme that is different from the first wireless communication scheme; and a processing unit that performs communication control of the first wireless communication unit and the second wireless communication unit, in which the processing unit determines whether or not a designation electronic apparatus that is a target which performs a job in compliance with the first wireless communication scheme is present, based on a result of the wireless communication with the designation electronic apparatus in compliance with the second wireless communication scheme, and, in a case where the designation electronic apparatus is not present, performs processing that displays a screen for the absence, on a display unit.

Furthermore, according to still another aspect of the invention, there is provided a display control method in a terminal apparatus that includes a first wireless communication unit which performs wireless communication with an electronic apparatus using a first wireless communication scheme, and a second wireless communication unit which performs wireless communication with the electronic apparatus using a second wireless communication scheme that is different from the first wireless communication scheme, the method including determining whether or not a designation electronic apparatus that is a target that performs a job in compliance with the first wireless communication scheme is present, based on a result of the wireless communication in compliance with the second wireless communication scheme; and performing processing that displays a screen for the absence on a display unit, in a case where the designation electronic apparatus is not present.

BRIEF DESCRIPTION OF THE DRAWINGS

The invention will be described with reference to the accompanying drawings, wherein like numbers reference like elements.

FIG. 7 is a diagram illustrating an example of a structure of data relating to the electronic apparatus, which is stored in a storage unit of the terminal apparatus.

FIG. 9 is a diagram illustrating an example of a data structure of a BLE beacon signal.

DESCRIPTION OF EXEMPLARY EMBODIMENTS

The present embodiment will be described below. It is noted that the present embodiment which will be described below does not improperly limit the subject matter of the invention that is claimed in a claim. Furthermore, all configurations that will be described in the present embodiment are not necessarily configurational requirements for the invention.

1. Example of a Configuration of a System

Figure 1:
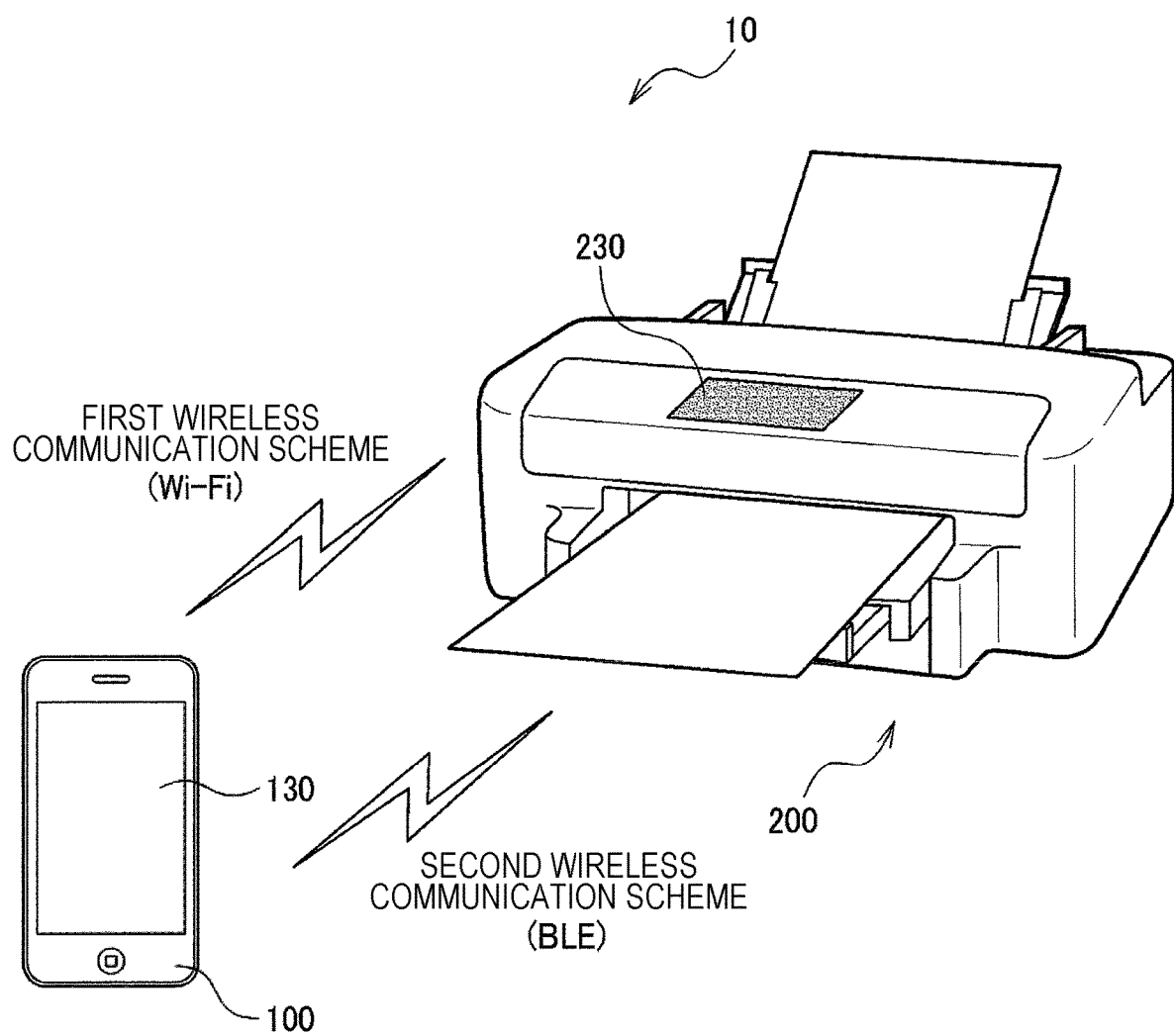
FIG. 1 is a diagram illustrating an example of a configuration of a communication system.

FIG. 1 is a diagram schematically illustrating an example of a terminal apparatus 100 and a communication system 10. The communication system 10 includes the terminal apparatus 100 and an electronic apparatus 200.

The terminal apparatus 100 is a portable terminal apparatus, such as a smartphone or a tablet terminal. However, the terminal apparatus 100 may be any other apparatus such as a personal computer (PC).

The electronic apparatus 200, for example, is a printer. Alternatively, the electronic apparatus 200 may be a scanner, a facsimile machine, or a copy machine. The electronic apparatus 200 may be a multifunction peripheral (MFP) that has multiple functions, and a multifunction peripheral that has a printing function is also an example of the printer. The electronic apparatus 200 according to the present embodiment possibly makes a connection to the terminal apparatus 100 using a first wireless communication scheme, and examples of the electronic apparatus 200 include further any arbitrary apparatus that possibly transmits a beacon signal in compliance with a second wireless communication scheme. The electronic apparatus 200 may be a projector, a head-mounted display device, a wearable device, a biological information measuring instrument, such as a pulse meter or a physical activity meter, a robot, a video apparatus, such as a camera, a portable information terminal, such as a smartphone, a physical quantity measuring instrument, or the like.

As illustrated in FIG. 1, the terminal apparatus 100 and the electronic apparatus 200 possibly perform wireless communication in compliance with the first wireless communication scheme and wireless communication in compliance with the second wireless communication scheme.

From the perspective of standards, a communication speed and a communication-available distance are longer and higher, respectively, in the first wireless communication scheme than in the second wireless communication scheme. The first wireless communication scheme is a wireless LAN in a narrow sense, and, more specifically, Wi-Fi. Wi-Fi, for example, is IEEE 802.11 standards, and is standards that are equivalent to IEEE 802.11 standards. An example will be described below in which the first wireless communication scheme is Wi-Fi, but it is possible that the first wireless communication scheme may be any other communication scheme.

Although not illustrated in FIG. 1, there are two configurations in which the terminal apparatus 100 makes a connection to the electronic apparatus 200 using the first wireless communication scheme. The terminal apparatus 100 may make a connection to the electronic apparatus 200 through any other apparatus such as a wireless LAN router, and makes a direct connection to the electronic apparatus 200. For example, in a case where the electronic apparatus 200 operates in an infrastructure mode and connects to a given external access point, the terminal apparatus 100 makes a wireless connection to the external access point, and thus communication is performed between the terminal apparatus 100 and the electronic apparatus 200. In this case, the connection between the electronic apparatus 200 and the external access point is not limited to the wireless connection and may be realized in a wired manner.

Alternatively, the electronic apparatus 200 activates an internal access point and the terminal apparatus 100 makes a connection to the internal access point, and thus communication is directly performed between the terminal apparatus 100 and the electronic apparatus 200. The direct connection between the terminal apparatus 100 and the electronic apparatus 200 may be made through communication in compliance with Wi-Fi Direct (WFD) standards, and may be performed in a Wi-Fi ad hoc mode.

It is noted that it is assumed that the electronic apparatus 200 according to the present embodiment is an apparatus that either makes a connection to the external access point or activates the internal access point. In other words, it is not assumed that one electronic apparatus 200 makes a connection to the external access point and activates the internal access point at the same time.

From the perspective of standards, a communication speed and a communication-available distance are lower and shorter, respectively, in the second wireless communication scheme than the first wireless communication scheme, and possibly transmits the beacon signal. The second wireless communication scheme is Bluetooth in a narrow sense, and, more precisely, for BLE. Bluetooth, for example, is IEEE 802.15.1 standards, and is standards that are equivalent to IEEE 802.15.1 standards. An example will be described below in which the second wireless communication scheme refers to BLE, but it is possible that the first wireless communication scheme may be any other communication scheme. The beacon signal in compliance with BLE corresponds to an advertisement packet. It is noted that the transmission of the beacon signal is possible with the first wireless communication scheme without any constraint. If the first wireless communication scheme is Wi-Fi, the electronic apparatus 200 transmits a beacon signal that makes service set identifier (SSID) of its own known. A beacon signal that complies with Wi-Fi standards and a beacon signal that complies with BLE standards are hereinafter expressed as a Wi-Fi beacon signal a BLE beacon signal, respectively.

Figure 2:
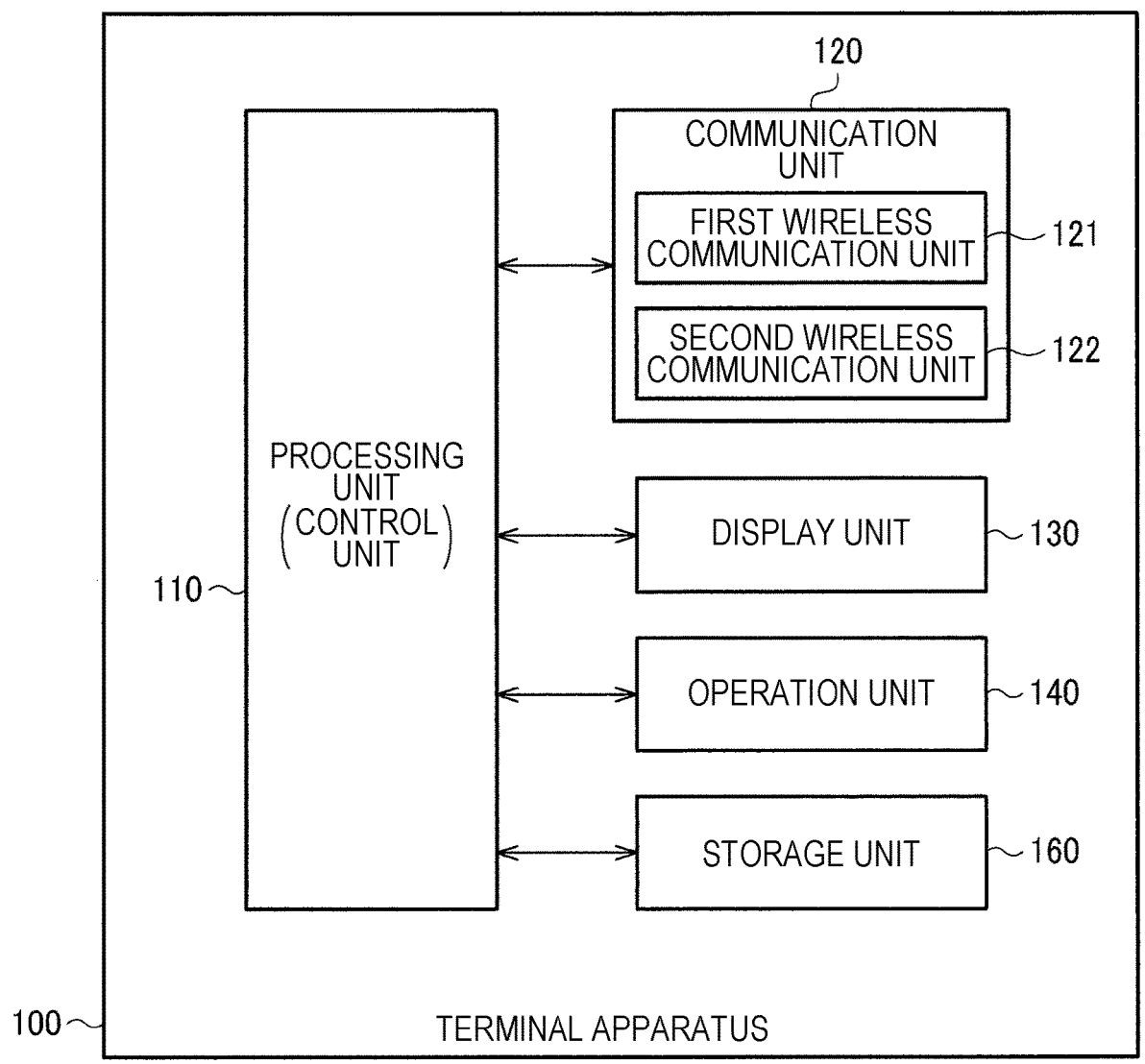
FIG. 2 is a diagram illustrating an example of a configuration of a terminal apparatus.

FIG. 2 is a block diagram illustrating an example of a configuration of the terminal apparatus 100. The terminal apparatus 100 includes a processing unit 110, a communication unit 120, a display unit 130, an operation unit 140, and a storage unit 160. For example, the processing unit 110 is a processor or a controller, the communication unit 120 is a communication interface, the display unit 130 is a display, the operation unit 140 is an operation button or the like, and the storage unit 160 is a storage device or a memory.

The processing unit 110 performs control of each of the communication unit 120, the display unit 130, the operation unit 140, and the storage unit 160.

Each processing operation and each function according to the present embodiment, which is performed by the processing unit 110, can be realized by a processor that includes hardware. For example, each processing operation according to the present embodiment can be realized by a processor that operates based on an information such as a program, and a memory in which the program and the information are stored. The processor here, for example, may cause a function of each unit to be realized in individual hardware or may cause the function of each unit to be realized in integrated hardware. For example, the processor can include a piece of hardware, and the piece of hardware can include at least one of a circuit that processes a digital signal and a circuit that processes an analog signal. For example, the processor can be configured with one or multiple circuit devices that are mounted on a circuit substrate, or with one or multiple circuit elements. The circuit device here is an integrated circuit (IC), or the like, and the circuit element is a resistor, a capacitor, or the like. The processor, for example, may be a central processing unit (CPU). However, the processor is not limited to the CPU, and it is possible that various processors such as a graphics processing unit (GPU) and a digital signal processor (DSP) are used. Furthermore, the processor may be a hardware circuit such as an application specific integrated circuit (ASIC). Furthermore, the processor may be configured with multiple CPUs, and may be configured with hardware circuits such as multiple ASICs. Furthermore, the processor may be configured with a combination of multiple CPUs and hardware circuits such as multiple ASICs.

The communication unit 120 includes a first wireless communication unit 121 and a second wireless communication unit 122. The first wireless communication unit 121 is a wireless communication device that performs wireless communication that complies with Wi-Fi standards, and the second wireless communication unit 122 is a wireless communication device that performs wireless communication in compliance with BLE standards. Each wireless communication device, for example, is a wireless communication chip.

The display unit 130 is configured with a display on which various pieces of information are displayed for the user, and the like, and the operation unit 140 is configured with a button on which a user performs an input operation, and the like. It is noted that the display unit 130 and the operation unit 140 may be configured to be integrally combined into a touch panel.

The storage unit 160 (a storage device or a memory) stores various information including a data and a program. The processing unit 110 or the communication unit 120, for example, operates with the storage unit 160 as a working area. The storage unit 160 may be a semiconductor memory, such as a static random access memory (SRAM) or a dynamic random access memory (DRAM), may be a register, be a magnetic memory device such as a hard disk drive (HDD), and may be an optical storage device such as an optical disk.

Figure 3:
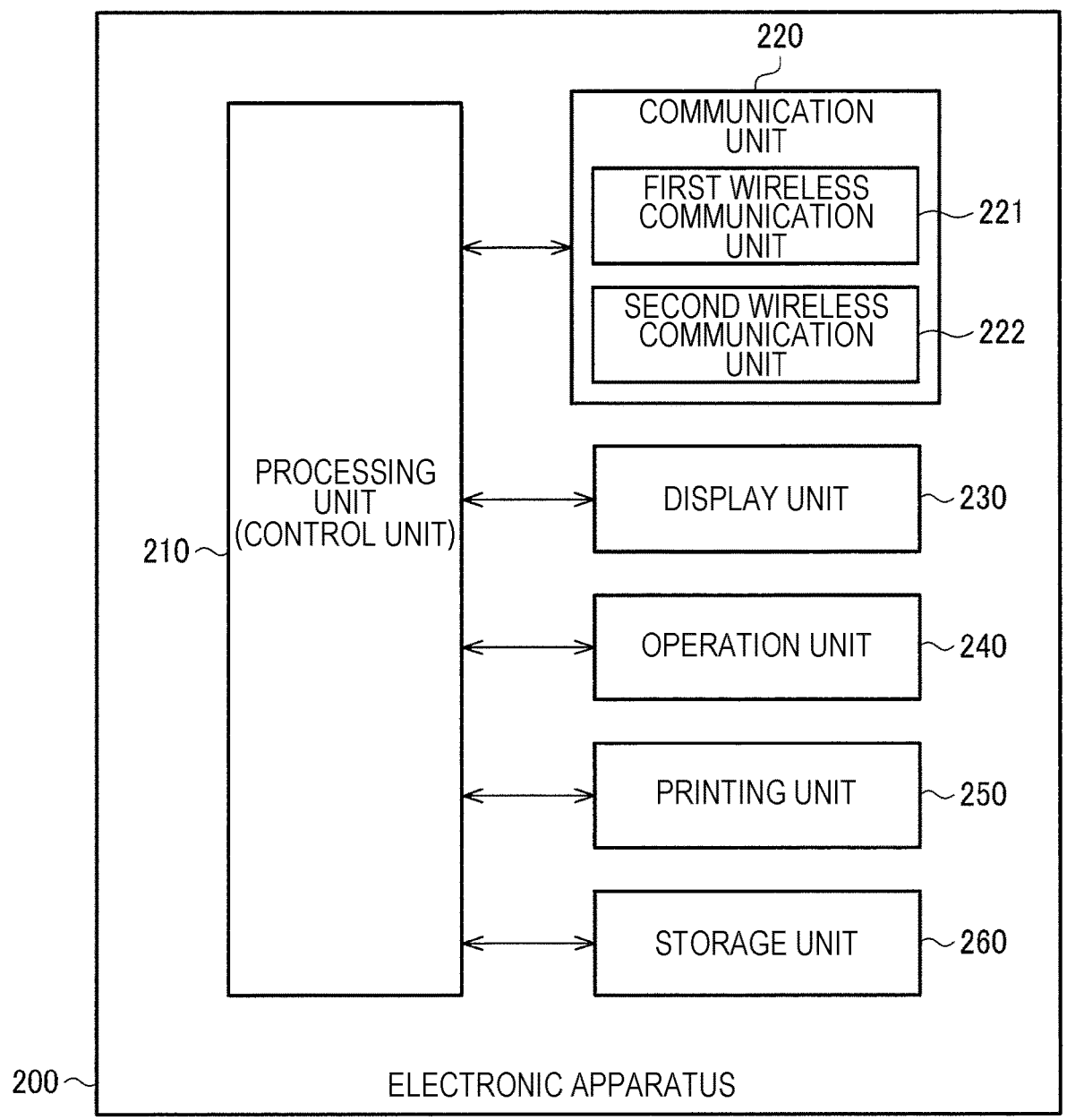
FIG. 3 is a diagram illustrating an example of a configuration of an electronic apparatus.

FIG. 3 is a block diagram illustrating an example of a configuration of the electronic apparatus 200. It is noted that FIG. 3 illustrates the electronic apparatus 200 that has a printing function and that an example where the electronic apparatus 200 is a printer will also be described below. However, as described above, examples of the electronic apparatus 200 further include apparatuses other than the printer. The electronic apparatus 200 includes a processing unit 210, a communication unit 220, a display unit 230, an operation unit 240, a printing unit 250, and a storage unit 260.

The processing unit 210 performs control of each of the units of the electronic apparatus 200. For example, the processing unit 210 can include multiple CPUs, such as a main CPU and a sub-CPU, or a micro-processing unit (MPU). The main CPU performs control of each of the units of the electronic apparatus 200 or overall control of the electronic apparatus 200. The sub-CPU performs various processing operations for printing, for example, in a case where the electronic apparatus 200 is a printer. Alternatively, a CPU for communication processing may be further provided.

The communication unit 220 includes a first wireless communication unit 221 and a second wireless communication unit 222. The first wireless communication unit 221 is a wireless communication device that performs wireless communication that complies with Wi-Fi standards, and the second wireless communication unit 222 is a wireless communication device that performs wireless communication in compliance with BLE standards. The first wireless communication unit 221 makes a Wi-Fi connection to an external access point. Alternatively, the first wireless communication unit 221 activates an internal access point according a given connection setting, and receives a connection request from the terminal apparatus 100. The connection settings are settings of a SSID, a password or a passphrase, a communication frequency band, an encryption scheme, and the like. The setting of the communication frequency band corresponds to a channel setting.

Furthermore, although not illustrated in FIG. 3, the communication unit 220 may include a third communication unit for making a connection to an external access point in a wired-connection manner. The communication unit 220, for example, is configured in such a manner that the first wireless communication unit 221 and the third communication unit are included and that effective or ineffective switching among first to third connection modes is possible. The first connection mode is a connection mode in which the first wireless communication unit 221 makes a wireless connection to the external access point. The second connection mode is a connection mode in which the first wireless communication unit 221 activates the internal access point. The third connection mode is a connection mode in which the third communication unit makes a wired connection to the external access point. Furthermore, a modification implementation in which one of the first wireless communication unit 221 and the third communication unit is omitted is also possible.

The display unit 230 is configured with a display on which various pieces of information are displayed for the user, and the like, and the operation unit 240 is configured with a button on which the user performs an input operation, and the like. It is noted that, for example, the display unit 230 and the operation unit 240 may be configured to be integrally combined into a touch panel.

The printing unit 250 includes a printing engine. The printing engine has a mechanical configuration in which printing of an image is performed on a printing medium. The printing engine, for example, includes a transportation mechanism, an ink jet type discharge head, and a driving mechanism for a carriage including the discharge head, and the like. The printing engine discharges ink from the discharge head onto the printing medium that is transmitted by the transportation mechanism, and thus prints an image on the printing medium. As the printing medium, various media can be used such as a paper sheet and a piece of cloth. It is noted that the specific configuration of the printing engine is not limited to that described here as an example, and may be one in which printing that uses toner is performed using an electrophotographic method.

The storage unit 260 (a storage device or a memory) stores various information including a data and a program. The processing unit 210 or the communication unit 220, for example, operates with the storage unit 260 as a working area. The storage unit 260 may be a semiconductor memory, may be a register, may be a magnetic memory device, and may be an optical storage device.

2. Technique According to the Present Embodiment

Next, a technique according to the present embodiment will be described. To begin with, an outline is described, and thereafter, a first embodiment and a second embodiment are described.

2.1 Outline

Figure 4:
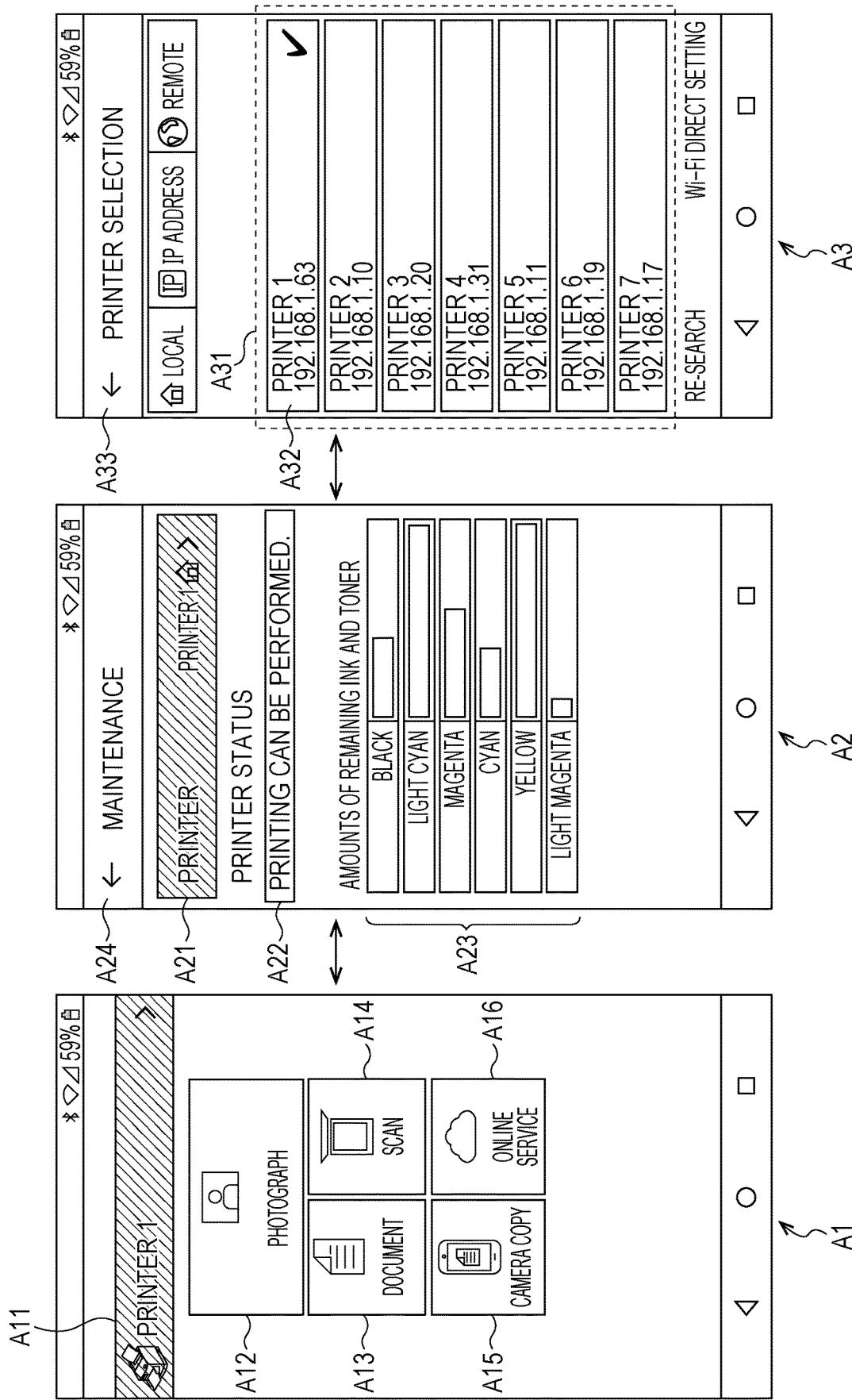
FIG. 4 is a diagram illustrating an example of transition of a screen that is displayed on a display unit.

FIG. 4 illustrates an example of screens that result from a print application running on the terminal apparatus 100. The print application runs on an operation system of the terminal apparatus 100, and performs various processing operations relating to printing.

A1 of FIG. 4 is a home screen of the print application, and for example, is a screen that is displayed when the print application is activated. On the home screen, a display (A11) of a name of a designation electronic apparatus that is designated as a target which performs a job and one or multiple panels that correspond to functions that are possibly performed by the designation electronic apparatus are displayed. In an example in FIG. 4, a photograph panel (A12), a document panel (A13), a scan panel (A14), a camera copy panel (A15), and an online service panel (A16) are displayed as panels, an operation is performed on each panel, and thus the print application performs a corresponding function.

For example, in a case where the photography panel is selected, the panel application displays pieces of photograph data that are stored in the terminal apparatus 100, and urges the user to select photograph data that is a printing target. When an operation of selecting the photograph data is performed, proceeding to a screen for an instruction for performing printing, which will be described below with reference to FIG. 5, takes place. In a case where the document panel is selected, the print application displays a screen for urging the user to select document data that is a printing target, and, when an operation of selecting the document data is performed, proceeding to the screen for an instruction for performing printing takes place.

In the example in FIG. 4, because the printer 1 that is a designation electronic apparatus has a function of a scanner, the scan panel is displayed on the home screen. In a case where the scan panel is selected, the print application instructs the printer 1 to perform an operation of scanning a medium, and performs processing that receives scan data.

The camera copy is a function of performing keystone correction on a capture image that is captured in a camera and of creating print data. In a case where the camera copy panel is selected, the print application activates the camera. When the camera captures an image, image processing such as the keystone correction is performed, print data is created, and proceeding to the screen for an instruction for performing printing takes place. The online service is a service for print data that is retained in an online storage. In a case where the online service panel is selected, the print application makes a connection to the Internet using a mobile communication network, Wi-Fi, or the like, and displays the data in the online storage. When an operation of selecting data that is a printing target is performed, proceeding to the screen for an instruction for performing printing takes place.

A2 of FIG. 4 is a maintenance screen for the designation electronic apparatus. On the home screen, in a case where an operation is performed on an A11 area, proceeding to the maintenance screen takes place. On the maintenance screen, a name (A21) of the designation electronic apparatus, status information on the designation electronic apparatus (A22), and information (A23) on an amount of remaining ink or toner are displayed. The status information is information indicating a status, such as an idle status, an operating status, or an error status. The status information will be described in detail below. On the maintenance screen, when an operation is performed on a return button (A24), proceeding to the home screen takes place. Furthermore, although not illustrated in FIG. 4, the maintenance screen may include an operation object for causing the designation electronic apparatus to perform a maintenance operation such as head cleaning.

A3 of FIG. 4 is a screen for selection of the designation electronic apparatus. On the maintenance screen, in a case where an operation is performed on an A21 area, proceeding to the screen for selection of the designation electronic apparatus takes place. In a state where the designation electronic apparatus is not selected, in a case where an operation is performed on the A11 area on the home screen, direct proceeding to the screen for selection may take place without displaying the maintenance screen.

On the screen for selection, the electronic apparatus 200 that is a candidate for the designation electronic apparatus is list-displayed (A31). The electronic apparatus 200 that is displayed on the screen for selection is the electronic apparatus 200 that has been selected in the past by the terminal apparatus 100. Alternatively, the processing unit 110 may search for the electronic apparatus 200 by performing a Wi-Fi function of the first wireless communication unit 121, and may list-display the electronic apparatus 200 that is found as a result of the search. In the example in FIG. 4, an object A32 in the shape of a check mark is displayed in a state of being associated with the printer 1 that has been selected as the designation electronic apparatus. On the screen for selection, when an operation is performed on a return button (A33), proceeding to the maintenance screen takes place.

Figure 5:
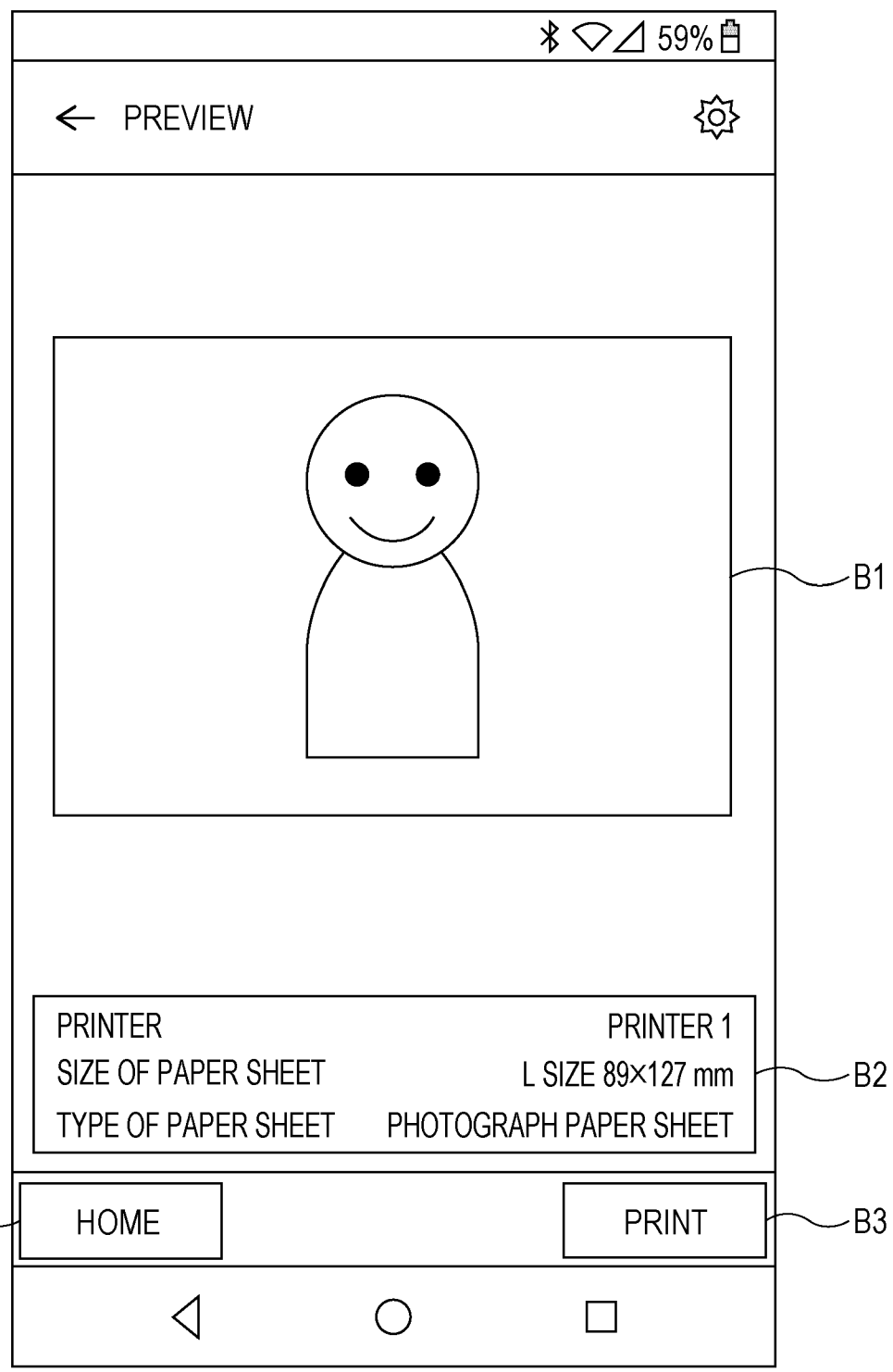
FIG. 5 is a diagram illustrating an example of a screen for an instruction for performing printing, which is a screen for an instruction for performing a job.

FIG. 5 illustrates an example of the screen for an instruction for performing printing. As described above, in a case where data that is a printing target is determined, the screen for an instruction for performing printing is displayed. In an example in FIG. 5, on the screen for an instruction for performing printing, a preview (B1) of print data, a print setting (B2), a print button (B3), and a button (B4) for transitioning to the home screen are displayed. The printing setting includes a name of a printer that is a designation electronic apparatus, a size of paper sheet that is used for printing, and information on a type of paper sheet.

In FIG. 5, when an operation is performed on a print button, the processing unit 110 that operates according to the print application transmits print data to the designation electronic apparatus, and instructs the designation electronic apparatus to perform a printing job.

Because the terminal apparatus 100 transmits a large amount of print data at a high speed, it is considered that a Wi-Fi connection to a printer is made. However, regarding the print application in the related art, in most cases, Wi-Fi is usually set to be OFF, and, only whenever necessary, Wi-Fi is set to be ON. Power is consumed much more in Wi-Fi than in a wireless communication scheme such as BLE. The terminal apparatus 100 is assumed to be a portable terminal apparatus such as a smartphone. Thus, in order for the terminal apparatus 100 to operate on a capacity-limited battery for a long time, there is a need to shorten the time for which Wi-Fi is set to be ON.

Furthermore, although Wi-Fi itself is set to be ON, in some cases, the establishment of the connection to the electronic apparatus 200 is limited to a necessary situation. This is because, in a case where a Wi-Fi connection to the Internet is made, if a connection destination switches to the electronic apparatus 200, a communication over the Internet cannot be performed. In an electronic apparatus 200-4 or an electronic apparatus 200-5, which will be described below with reference to FIG. 6, a direct connection is made, with WFD, between the terminal apparatus 100 and the electronic apparatus. For this reason, while a connection is being established, a connection between the terminal apparatus 100 and an external access point 20 is released, and the terminal apparatus 100 cannot make the Wi-Fi connection to the Internet. If the time for which the terminal apparatus 100 and the electronic apparatus 200 are connected to each other with WFD is shortened, the time for which the terminal apparatus 100 cannot make a connection to the terminal apparatus 100 can be shortened.

In either case, it is considered that the print application of the terminal apparatus 100 does not always establish a Wi-Fi connection to the designation electronic apparatus, and attempts to make a Wi-Fi connection to the designation electronic apparatus when a necessary situation occurs. The necessary situation is specifically a situation where an operation is performed on the print button (B3) in FIG. 5. Even in a case where any one of the photograph (A12), the document panel (A13), the camera copy panel (A15), and the online service panel (A16) is used, there is no need to establish the Wi-Fi connection to the designation electronic apparatus when creating print data. While the print data is being created, a Wi-Fi connection to the electronic apparatus 200 is not made, and thus a reduction in power consumption and a Wi-Fi connection to the Internet are possible.

Furthermore, in some cases, to create print data, the user not only simply selects an existing file, but also performs a process or the like. For example, the process, such as trimming of photograph data, adjusting of an arrangement position or of positioning, or adding of a handwritten character or illustration, or a stamp, and the like are considered. In such a case, it mostly takes time to create print data and there is a big advantage in that the Wi-Fi connection to the electronic apparatus 200 is not made while print data creation is in progress.

Furthermore, the Wi-Fi connection to the electronic apparatus 200 is not made while the print data creation is in progress, and thus there is an advantage in that no working is not limited. For example, in a case where the terminal apparatus 100 is an apparatus that is easy to carry on the person, such as a smartphone, a tablet, or a notebook PC, in some cases, the user takes out the terminal apparatus 100 to a visiting destination or the like. In this case, it is also possible that the user creates print data at a place that is at a distance away from the designation electronic apparatus, and prints the print data after returning to a place where the Wi-Fi connection to the designation electronic apparatus is possible. That is, the flexibility that the user feels in an aspect of the use of the terminal apparatus 100 and the electronic apparatus 200 increases, and an improvement in convenience is possible.

However, when an operation is performed on the print button, in some cases, the designation electronic apparatus is not available for the Wi-Fi connection to the terminal apparatus 100. For example, a case is considered where, as described above, the terminal apparatus 100 is taken out to a place where the Wi-Fi connection to the designation electronic apparatus cannot be made, or a case is considered where the terminal apparatus 100 is close to the designation electronic apparatus, but where the designation electronic apparatus is in a powered-off state.

As a result, the terminal apparatus 100 attempts to make the Wi-Fi connection to the designation electronic apparatus without success, and waits until timeout of the connection attempt occurs. Because it takes approximately a long time to reach the time out, the efficiency of the user's working decreases.

The terminal apparatus 100 according to the present embodiment, as illustrated in FIG. 2 includes the first wireless communication unit 121 that performs wireless communication with the electronic apparatus 200 using the first wireless communication scheme, the second wireless communication unit 122 that performs wireless communication with the electronic apparatus 200 using the second wireless communication scheme that is different from the first wireless communication scheme, and the processing unit 110 that performs communication control of the first wireless communication unit 121 and the second wireless communication unit 122.

Then, the processing unit 110 determines whether or not the designation electronic apparatus that is a target that performs a job using the first wireless communication scheme, based on a result of the wireless communication with the designation electronic apparatus, which uses the second wireless communication scheme. Moreover, in a case where the designation electronic apparatus is not present, the processing unit 110 performs processing that displays a screen for the absence on the display unit.

The job here refers to an operation that the electronic apparatus 200 performs using a function of the electronic apparatus 200 itself. In a case where the electronic apparatus 200 is a printer, the job corresponds to the printing job. In a case where the electronic apparatus 200 is a scanner, the job corresponds to a scanning job. A job is performed in the electronic apparatus 200, but it is possible that any other apparatus provides an instruction for performing the job or that processing-target data in the job is transmitted and received to and from any other apparatus. The terminal apparatus 100 according to the present embodiment provides the instruction for performing the job and performs transmission and reception of the processing-target data, using the first wireless communication scheme. The designation electronic apparatus is the electronic apparatus 200 that is designated as a target to which the terminal apparatus 100 provides the instruction for performing the job.

Furthermore, the non-existence here means that the designation electronic apparatus is not present in a state where the Wi-Fi connection to the terminal apparatus 100 is possible. The non-existence may refer to a state where the designation electronic apparatus is not positioned in a range where a Wi-Fi radio wave is received, and may refer to a state where the designation electronic apparatus is present at a nearby position but is powered off.

It is noted that an example in which a display screen is displayed on the display unit 130 of the terminal apparatus 100. That is, in a case where the designation electronic apparatus is not present, the processing unit 110 performs processing that displays the screen for the absence on display unit 130 of its own. However, the display unit is not limited to the display unit 130 of the terminal apparatus 100. For example, the processing unit 110 of the terminal apparatus 100 may perform processing that displays the screen for the absence on a display unit of an apparatus that is different from the terminal apparatus 100. For example, it is considered that processing that creates the print data or processing that transmits the print data is performed in the terminal apparatus 100 and that a screen in FIG. 4 or 5 is displayed on a display unit of a wearable apparatus such as a smartwatch or a head-mounted display. The "processing for displaying" in this case is processing that transmits the screen for the absence, processing that transmits information which provides an instruction for display, or the like.

The screen for the absence will be described in detail below in a first embodiment and a second embodiment. With the display of the screen for the absence, it is possible that an attempt is not made to make a connection to the designation electronic apparatus, or that the user is promptly notified that the designation electronic apparatus is not present and is urged to take a corrective action. Accordingly, what causes the user to operate an unnecessary operation or to consume waiting time can be suppressed. For example, it is possible that the user is smoothly caused to take measures, such as powering-off the printer, moving to another place, and reselecting another printer. Alternatively, it is possible that the user is smoothly caused to perform an operation such as retaining the print data without immediately printing the print data.

2.2 First Embodiment

Figure 6:
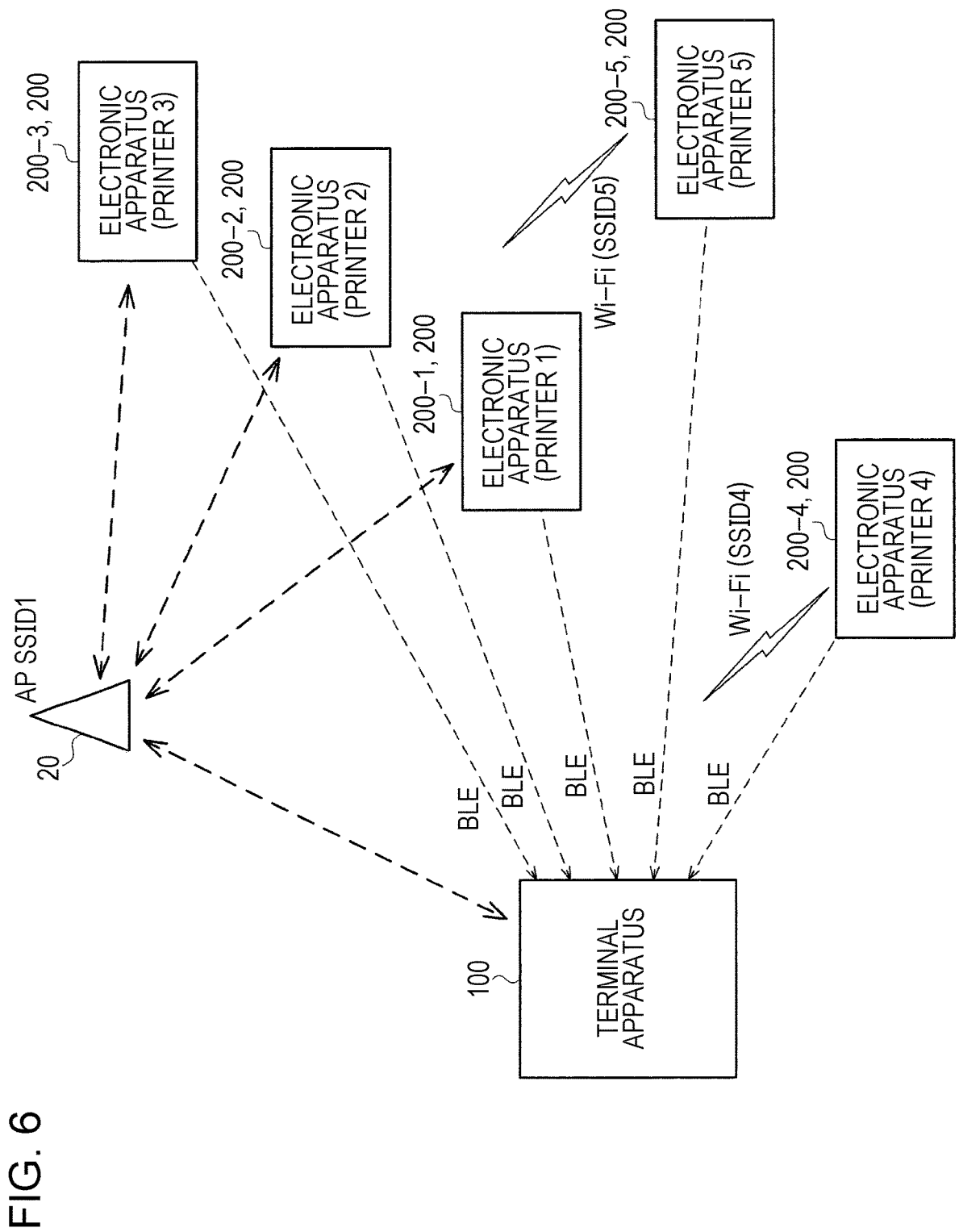
FIG. 6 is a diagram illustrating an example of a specific configuration of a communication system.

FIG. 6 illustrates a specific example of a system that includes the terminal apparatus 100 and the electronic apparatus 200. Multiple electronic apparatuses 200 are present in the vicinity of the terminal apparatus 100. In FIG. 6, as the multiple electronic apparatuses 200, five electronic apparatuses, that is, electronic apparatuses 200-1 to 200-5 are illustrated. The electronic apparatuses 200-1 to 200-5 are hereinafter expressed as a printer 1 to a printer 5, respectively, for convenience of description.

The printer 1 to the printer 3 are connected to the external access point 20 in a Wi-Fi infrastructure mode. The external access point 20 and the printers 1 to 3 may be connected to each other through a router over a wired LAN. In a case where the terminal apparatus 100 makes a Wi-Fi connection to the external access point 20, it is possible that the printer 1 to the printer 3 are connected to the terminal apparatus 100 through the external access point 20.

The printer 4 and the printer 5 each function as access points. Specifically, the first wireless communication unit 221 of each of the printer 4 and the printer 5 is activated and is possibly connected to the terminal apparatus 100 with WFD.

Furthermore, the printer 1 to the printer 5 transmit an advertisement packet that is a beacon signal that complies with the second wireless communication scheme, that is, a BLE beacon signal.

FIG. 7 illustrates an example of data relating to the electronic apparatus 200 that is a target to which the terminal apparatus 100 makes a Wi-Fi connection, which is data that is stored in the storage unit 160 of the terminal apparatus 100. As illustrated in FIG. 7, a printer name, identification information, capability information are stored in the storage unit 160.

Pieces of identification information are pieces of information by which the electronic apparatuses 200 are identifiable from each other. The identification information, for example, is a MAC address of the electronic apparatus 200, and, as the identification information, any other information that is a serial number, or the like may be used. Furthermore, the name is a manufacture number or the like of the electronic apparatus 200, and multiple electronic apparatuses 200 are allowed to have the same name.

The capability is information that indicates a function of the electronic apparatus 200. If the electronic apparatus 200 is a printer, the capability includes information on a paper sheet size that the printer supports and printing mode information. The information on the paper sheet size is information that specifies a size of a printing paper sheet which the printer possibly uses for printing, and for example, is the information that printing in a postcard size and A5 and A4 size is possible, but that printing in a size greater than an A3 size can be performed. The printing mode information is information that indicates whether or not to support color printing, to support duplex printing, to support CD label printing, and so forth. Furthermore, it is possible that, in addition to those described above, the capability includes various pieces of information that specify functions that the printer possibly performs when performing printing. Furthermore, if the electronic apparatus 200 is a scanner, the capability is information that includes a size of a paper sheet that is possibly scanned, a resolution, a saving format of data that results from the scanning, and the like. It is noted that the terminal apparatus 100 is assumed to acquire the capability information from the electronic apparatus 200 through a Wi-Fi connection, but may acquire the capability information using BLE. On this occasion, the capability is transmitted and received with the BLE beacon signal without any constraint, but if an amount of data is considered, it is desirable that a BLE connection is established and the transmission and reception of the capability are performed through BLE communication that results from establishing the BLE connection.

The terminal apparatus 100 acquires each piece of information that is illustrated in FIG. 7, when the Wi-Fi connection to the electronic apparatus 200 is made. In the case of an example in FIG. 7, the terminal apparatus 100 does not acquire information relating to the printer 3 without a connection to the printer 3 in FIG. 6. It is noted that when selecting the designation electronic apparatus, the terminal apparatus 100 may perform processing that temporarily establishes the Wi-Fi connection to the designation electronic apparatus, without depending on whether or not to provide an instruction for performing a job. If this is done, for the perspective of the terminal apparatus 100, the designation electronic apparatus is an electronic apparatus 200, the Wi-Fi connection to which was necessarily made in the past, and information relating to the designation electronic apparatus is already known.

Furthermore, in addition to the pieces of information that are illustrated in FIG. 7, connection information that is used when reconnection to each electronic apparatus 200 is made is stored in the storage unit 160 of the terminal apparatus 100. Because the printer 1 and the printer 2 are connected through the external access point 20, a SSID or a password of the external access point 20, an IP address of each electronic apparatus 200, and the like are stored. Because the printer 4 and the printer 5 are directly connected with WFD, an SSID and a password of each electronic apparatus 200 that functions as an internal access point are stored.

The processing unit 110 of the terminal apparatus 100 selects any one from among electronic apparatuses 200 that are illustrated in FIG. 7, as the designation electronic apparatus. An example in which the printer 1 is the designation electronic apparatus will be described below. In a case where an operation is performed on the print button in FIG. 5, the processing unit 110 reads information on the connection to the designation electronic apparatus from the storage unit 160, and attempts to make the Wi-Fi connection to the designation electronic apparatus.

Figure 8:
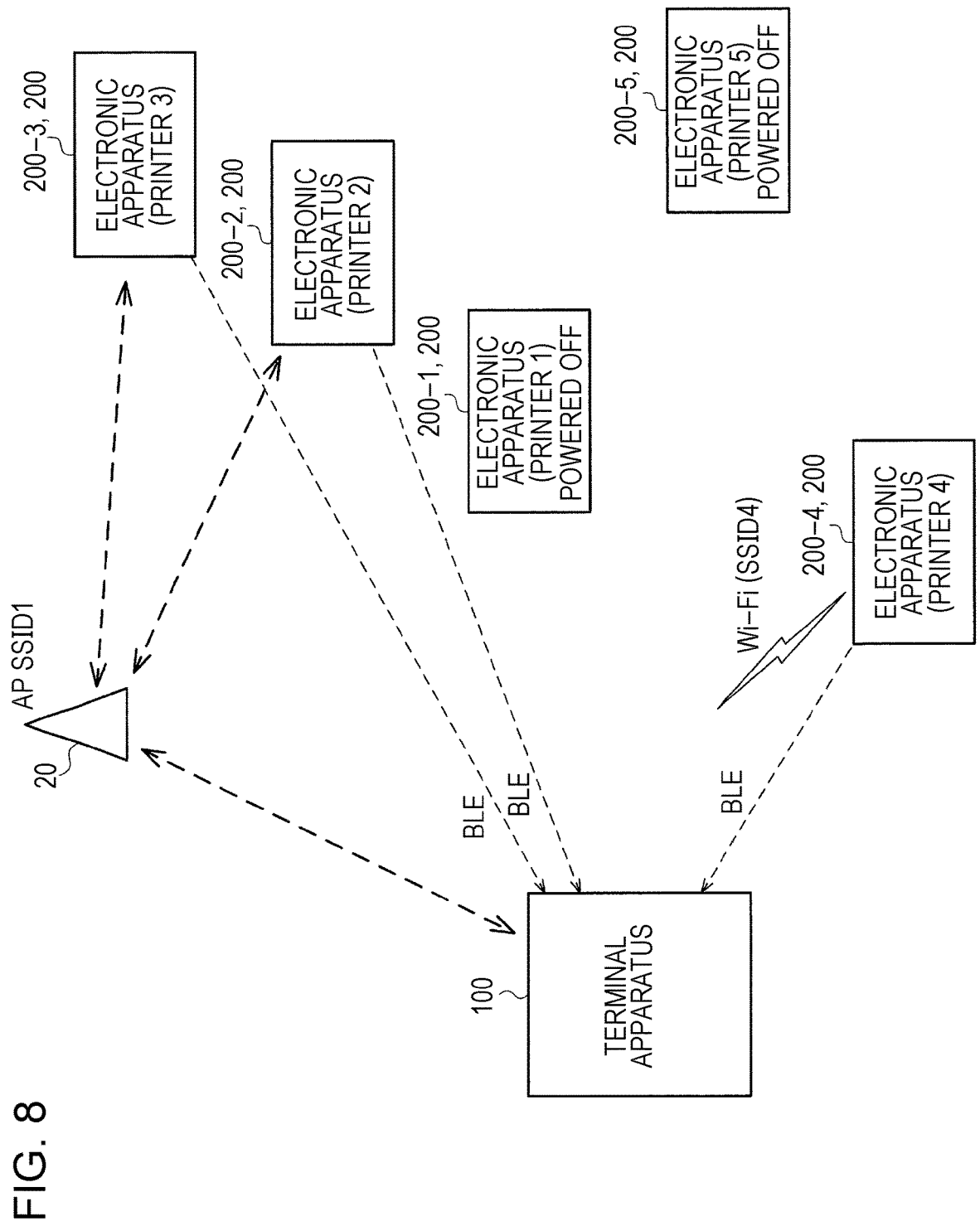
FIG. 8 is a diagram illustrating an example of a specific configuration of the communication system in a case where a designation electronic apparatus is not present.

If this is done, in a case where the print data needs to be transmitted, it is possible that an attempt is automatically made to make the Wi-Fi connection to the designation electronic apparatus. However, as described above, when an attempt is made to make a connection, the designation electronic apparatus is not necessarily in a state where the Wi-Fi connection is possible. For example, when the processing unit 110 of the terminal apparatus 100 is going to perform printing, the electronic apparatus 200 is assumed to be in a state that is illustrated in FIG. 8. In an example in FIG. 8, the printer 1 and the printer 5 are powered off. For this reason, in a case where the printer 1 or the printer 5 is selected as the designation electronic apparatus, although an attempt is made to make a Wi-Fi connection, there occurs a need for the terminal apparatus 100 to wait until the time out occurs, without the connection being made.

Consequently, based on the beacon signal in compliance with the second wireless communication scheme, the processing unit 110 determines whether or not the designation electronic apparatus is present. If this is done, before an attempt is made to make the Wi-Fi connection, the presence or absence of the designation electronic apparatus can be determined. Because the determination is made with the BLE beacon signal, communication control for establishing a connection, such as pairing or bonding, is unnecessary, and a reduction in power consumption and a decrease in processing load are possible.

FIG. 9 illustrates an example of a data structure of the BLE beacon signal. The BLE beacon signal is available for various uses, and in some cases, multiple types of BLE beacon signals are also transmitted and received between the terminal apparatus 100 and the electronic apparatus 200. A beacon identifier is information that specifies for which use the BLE beacon signal is used. The beacon identifier in FIG. 9 is information which indicates that the BLE beacon signal is a beacon for determining the presence, and is information that is different from a beacon identifier of a beacon that is used for any other use.

Pieces of identification information on the electronic apparatuses 200 is pieces of information by which the electronic apparatuses 200 possibly identity each other. The identification information here, for example, is the MAC address of the electronic apparatus 200, and, as the identification information, any other information may be used. However, as identification information in FIG. 9, information in the same format as the identification information in FIG. 7, which is retained in the terminal apparatus 100, or information which is possibly converted into the identification information in FIG. 7 and into which the identification information in FIG. 7 is possibly converted is used.

Status information is information that indicates a status of the electronic apparatus 200. The status information in a narrow sense is information that specifies whether an operating status of the electronic apparatus 200 is an idle status or an error status. The operating status is a state where the electronic apparatus 200 performs a job, such as printing, using a function of its own. A behavior in a case where a new job is input in the operating status is determined by a setting of the electronic apparatus 200, but for example, after a job that is currently being performed has been completed, proceeding to perform the job that is newly input takes place. The idle status is a state where the electronic apparatus 200 waits for job inputting, without performing a job. The error status is a state where any error occurs, a state where a job cannot be performed, or a state where a problem occurs while a job is performed. In the case of a printer, the error status is a state where ink or toner is used up, a printing medium, such as a paper sheet, is used up, a printing medium is jammed up, a component failure occurs, or the like.

In other words, it is considered that the operating status is a state where a new job cannot be immediately performed, that the idle status is a state where a new job is possibly immediately performed, and that the error status is a state where there is a need for the user to take a corrective action to perform a job. The status information, for example, is used for display (A22) of the maintenance screen in FIG. 4.

The processing unit 110 determines whether or not the designation electronic apparatus is present, based on a result of processing that compares the identification information on the designation electronic apparatus, which is acquired using the first wireless communication scheme, and the identification information that is included in the beacon signal in compliance with the second wireless communication scheme.

At this point, the identification information on the designation electronic apparatus, which is acquired using the first wireless communication scheme, is information that corresponds to the identification information in FIG. 7, and that was acquired through Wi-Fi when a Wi-Fi connection was established in the past between the terminal apparatus 100 and the electronic apparatus 200. However, it is also possible that the terminal apparatus 100 searches for the electronic apparatus 200 that has not been connected, using the Wi-Fi function and thus acquires identification information, and pieces of identification information on the designation electronic apparatuses, which are acquired using the first wireless communication scheme, may include such identification information. Furthermore, the identification that is included in the beacon signal in compliance with the second wireless communication scheme corresponds to the identification information in FIG. 9.

As described above, the identification information in FIG. 7 and the identification information in FIG. 9 are pieces of information in the same format, and are pieces of information that are mutually exchangeable. For this reason, it is possible that, by performing the processing that compares pieces of identification information, the terminal apparatus 100 suitably determines whether or not the electronic apparatus 200 that transmits the BLE beacon signal is the designation electronic apparatus. For example, in a case where the printer 1 is the designation electronic apparatus, the processing unit 110 can determine that the BLE beacon signal which includes "MAC ADDRESS 1" is a signal that is transmitted from the designation electronic apparatus. More precisely, in a case where the BLE beacon signal that includes "MAC ADDRESS 1" has been received, it can be determined that the designation electronic apparatus is in a state where at least the BLE beacon signal is possibly transmitted and that a distance to the terminal apparatus 100 is short such that the BLE beacon signal possibly arrives. That is, it is possible that the presence or absence of the designation electronic apparatus is determined depending on whether or not the BLE beacon signal that includes "MAC ADDRESS 1" has been received.

In the present embodiment, the processing unit 110 displays a screen that varies according to the presence or absence of the designation electronic apparatus. Specifically, the processing unit 110 performs processing that displays a screen for an instruction for performing a job, on the display unit 130, in a case where the designation electronic apparatus is present, and performs processing that displays a screen for the absence instead of the screen for an instruction for performing a job, on the display unit 130, in a case where the designation electronic apparatus is not present.

At this point, the screen for an instruction for performing a job is a screen that is used for providing an instruction for performing a job in the designation electronic apparatus. The screen for an instruction for performing a job corresponds to the screen for an instruction for performing printing in the printer, which is illustrated in FIG. 5. That is, in a case where the presence of the designation electronic apparatus cannot be checked, although an attempt is made to make a Wi-Fi connection in order to perform a job, there is no problem. Because of this, the screen for an instruction for performing a job is displayed as usual. If an operation of performing a job, which is performed by the user, or an operation on the print button in a narrow sense, is detected on the screen for an instruction for performing a job, an attempt is made to make a Wi-Fi connection, and, if the connection is established, transmission or reception of the processing-target data to and from the electronic apparatus 200 is performed. If the electronic apparatus 200 is a printer, print data is transmitted from the terminal apparatus 100. If the electronic apparatus 200 is a scanner, scan data is received by the terminal apparatus 100.

Figure 10:
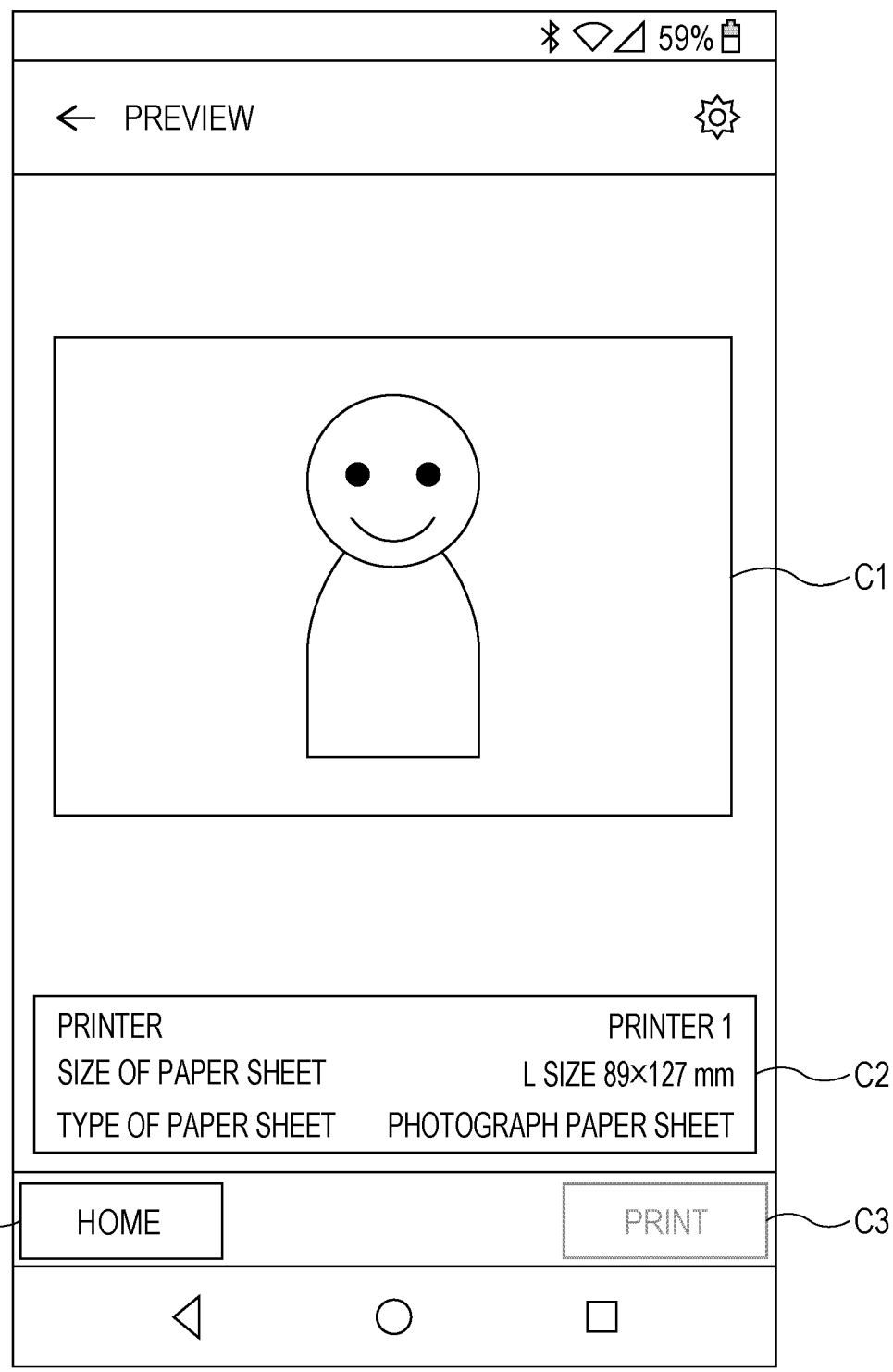
FIG. 10 is a diagram illustrating an example of a screen for the absence according to a first embodiment.

FIG. 10 illustrates an example of the screen for non-existence. The screen for an instruction for performing a job is a screen on which, as illustrated in FIG. 5, an object for performing a job is displayed, and the screen for the absence is a screen that results from changing a mode for displaying the object on the screen for an instruction for performing a job. At this point, the object for performing a job is an object that a job starts to be performed in a case where an operation of designating the object is performed, and corresponds to a print button B3 in FIG. 5.

In an example in FIG. 10, C1, C2, and C4 are the same as B1, B2, and B4, respectively, in FIG. 5, but from a comparison between C3 and B3, it is understood that the mode for displaying the print button varies. The processing unit 110 disables the print button and thus causes an operation to be performed on the print button. Along with this, the processing unit 110 displays the print button in gray. That is, the print button is disabled, but is displayed in such a manner as to be visually recognized. The mode for displaying an object is not limited to that in FIG. 10, and by displaying oblique lines and or X marks in a superimposed manner, the disablement may be clearly indicated. Alternatively, a change from the text "printing" to the text "printing is disabled" or the like may take place.

As illustrated in FIG. 10, by displaying the screen for the absence that is different from the screen for an instruction for performing a job, it is possible that a mode in which it is easy for the user to understand the absence of the designation electronic apparatus is presented. Accordingly, it is possible that the user is urged to take a corrective action without being caused to wait until the time out occurs.

Figure 11:
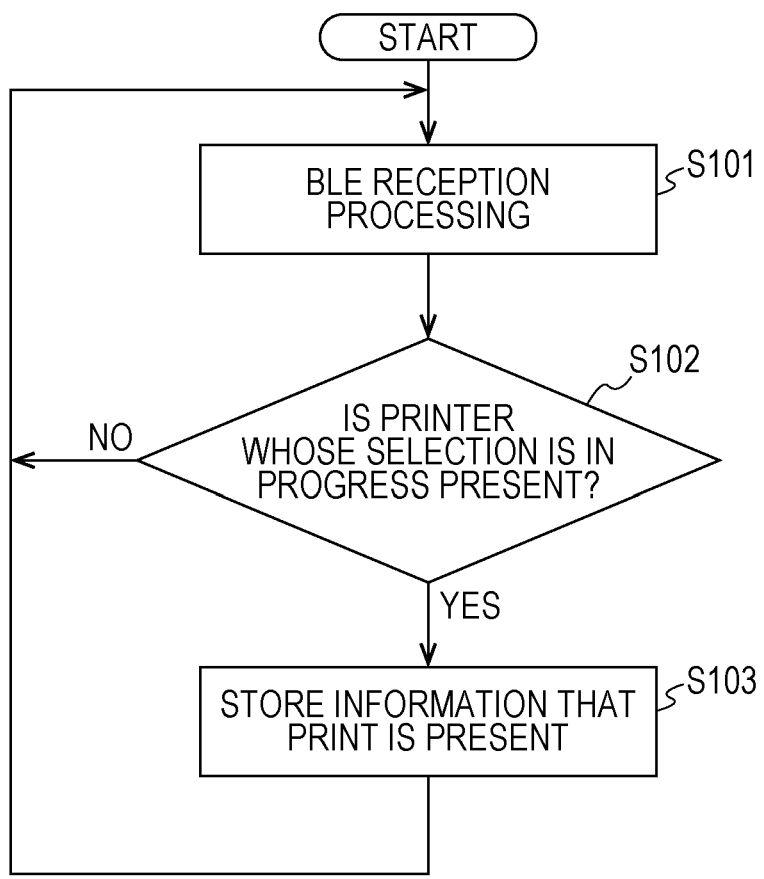
FIG. 11 is a flowchart for describing processing that receives the BLE beacon signal.
Figure 12:
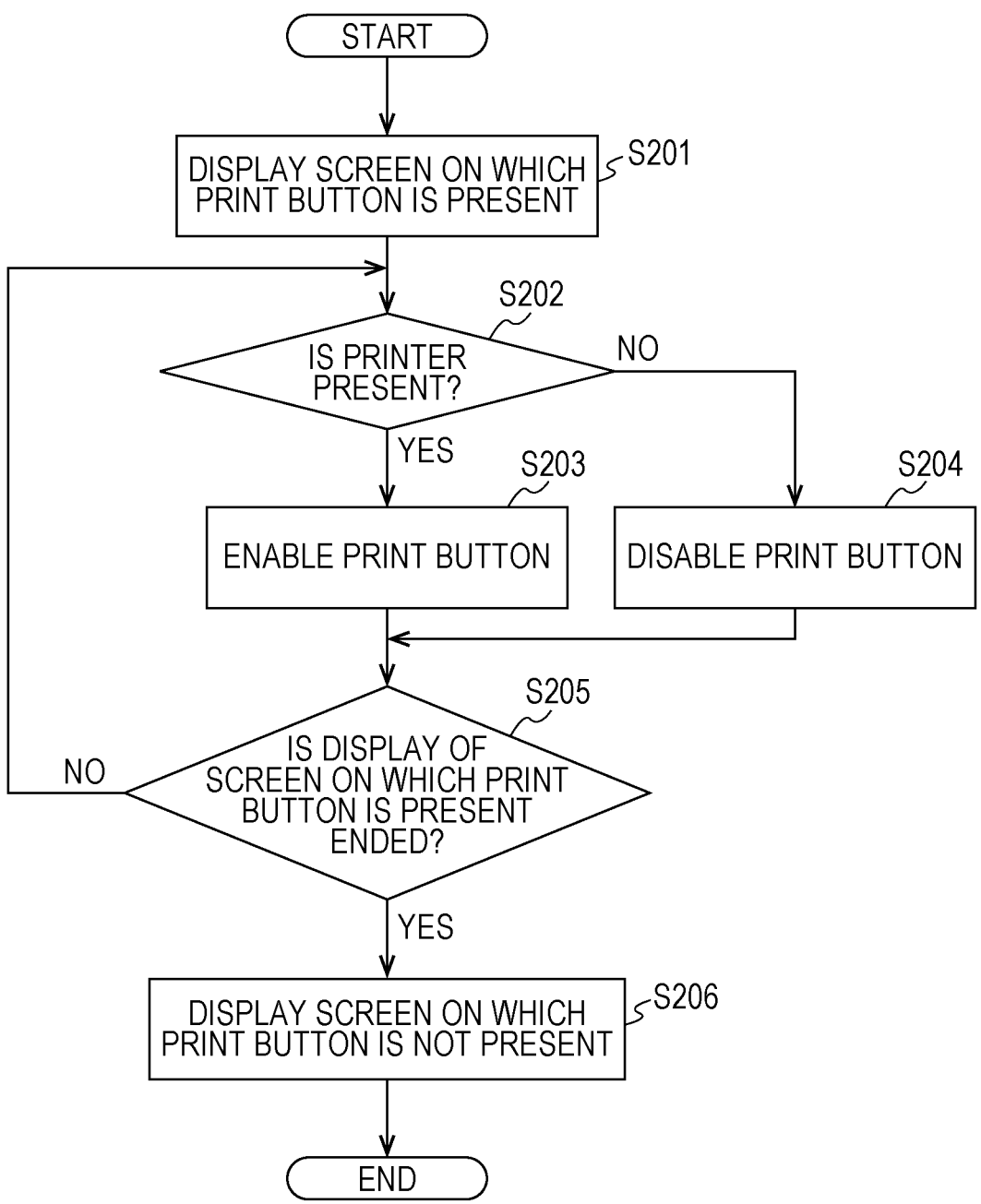
FIG. 12 is a flowchart for describing processing that displays according to the first embodiment.

FIGS. 11 and 12 are flowcharts, each for describing processing according to the present embodiment. FIG. 11 illustrates processing relating to BLE, which, for example, is performed repeatedly in the background. When the processing starts, the processing unit 110 performs processing that receives the BLE beacon signal, through the use of the second wireless communication unit 122 (S101). Then, processing that compares the identification information which is included in the BLE beacon signal and the identification information which is stored in the storage unit 160 is performed and it is determined whether or not the BLE beacon signal that is received in S101 is transmitted from the designation electronic apparatus (S102).

In a case where the BLE beacon signal is transmitted from the designation electronic apparatus (Yes in S102), it is determined that the designation electronic apparatus is present, information to that effect is stored in the storage unit 160 (S103), and returning to S101 takes place. In a case where the BLE beacon signal is transmitted from the electronic apparatus 200 other than the designation electronic apparatus (No in S102), processing in S103 is skipped and returning to S101 takes place. The designation electronic apparatus here is selected, in gray, as one that is not present. That is, as long as the BLE beacon signal is not received from the designation electronic apparatus, it is determined that the designation electronic apparatus is not present, and, when the processing in S103 is performed, it is determined that the designation electronic apparatus is present. It is noted that, although not illustrated in FIG. 10, in a case where it is determined that the designation electronic apparatus is present and then a given condition is satisfied, a result of determining the presence or absence of the designation electronic apparatus may return to the absence. For example, in a case where, for a fixed time, the BLE beacon signal cannot be continuously received from the designation electronic apparatus, it is determined that the designation electronic apparatus is not present.

FIG. 12 is a flowchart for describing display processing associated with display of the screen for an instruction for performing a job. When the processing is started, the processing unit 110 first recognizes an operation of causing transitioning to the screen for an instruction for performing a job is performed (S201). This, for example, corresponds to a case where an operation input indicating that creation of print data is completed is received. The processing unit 110 determines whether or not the designation electronic apparatus is present (S202). In a case where the designation electronic apparatus is present, the print button is enabled (S203). That is, processing that, as usual, displays the screen for an instruction for performing a job, which is illustrated in FIG. 5, is performed. In a case where the designation electronic apparatus is not present, the print button is disabled (S204). That is, instead of the usual screen for an instruction for performing a job, processing that displays the screen for the absence, which is illustrated in FIG. 10, is performed.

The processing unit 110 determines whether or not the display of the screen that includes the print button is ended (S205). For example, in a case where the operation of causing transitioning to the home screen is detected on the screen for an instruction for performing a job, or the screen for the absence, a result of the determination in S205 is Yes. In a case where the result of the determination in S205 is No, returning to S202 takes place and the processing continues. More precisely, although the screen for the absence is temporarily displayed, in a case where the BLE beacon signal has been received from the designation electronic apparatus, proceeding to the display of the screen for an instruction for performing a job takes place. Furthermore, even in a case where the screen for an instruction for performing a job is displayed, if the BLE beacon signal is not received for a fixed time and thus it is determined that the designation electronic apparatus is not present, proceeding to the display of absence may take place.

In a case where the result of the determination in S205 is Yes, the processing unit 110 performs processing that displays the home screen or the like (S206), and ends the processing.

2.3 Second Embodiment

In the first embodiment, the example is described in which the screen on which the print button is disabled is displayed as the screen for the absence. However, the screen for the absence is not limited to the one on which a mode for displaying the object for performing a job is changed. The processing unit 110 according to the present embodiment enables the print button itself. In a case where an operation is performed on the print button, the processing unit 110 changes the processing according to the presence or absence of the designation electronic apparatus.

Specifically, in a case where the operation of performing a job is detected, if the designation electronic apparatus is present, the processing unit 110 instructs the designation electronic apparatus to perform a job, using the first wireless communication scheme. Furthermore, if the designation electronic apparatus is not present, the processing unit 110 performs processing that displays the screen for the absence on the display unit 130. If this is done, in a case where the designation electronic apparatus is present, a behavior of the terminal apparatus 100 when viewed from the user is the same as in the first embodiment, and a job is started as usual.

Figure 13:
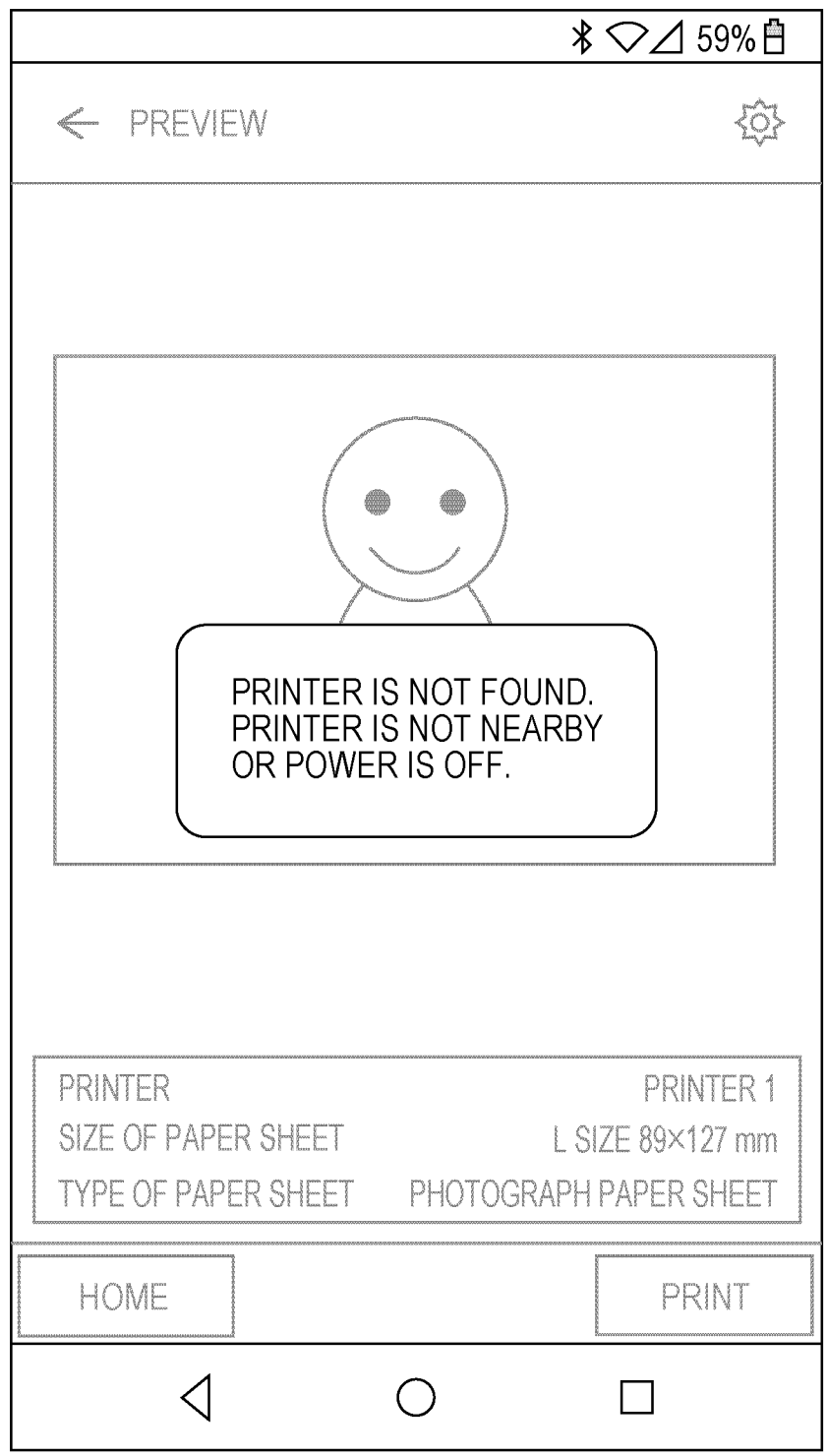
FIG. 13 is a diagram illustrating an example of a screen for the absence according to a second embodiment.

Furthermore, in the case where the designation electronic apparatus is not present, the screen for the absence is displayed. The screen for the absence here is a message screen that notifies the absence of the designation electronic apparatus. FIG. 13 illustrates an example of the screen for the absence according to the present embodiment. As illustrated in FIG. 13, the message "PRINTER IS NOT FOUND. PRINTER IS NOT NEARBY OR POWER IS OFF" is displayed in a pop-up format on the screen for an instruction for performing printing in FIG. 5. By the message being displayed in this manner, the user can be definitely alerted to the absence of the designation electronic apparatus and is possibly urged to take a suitable corrective action.

Figure 14:
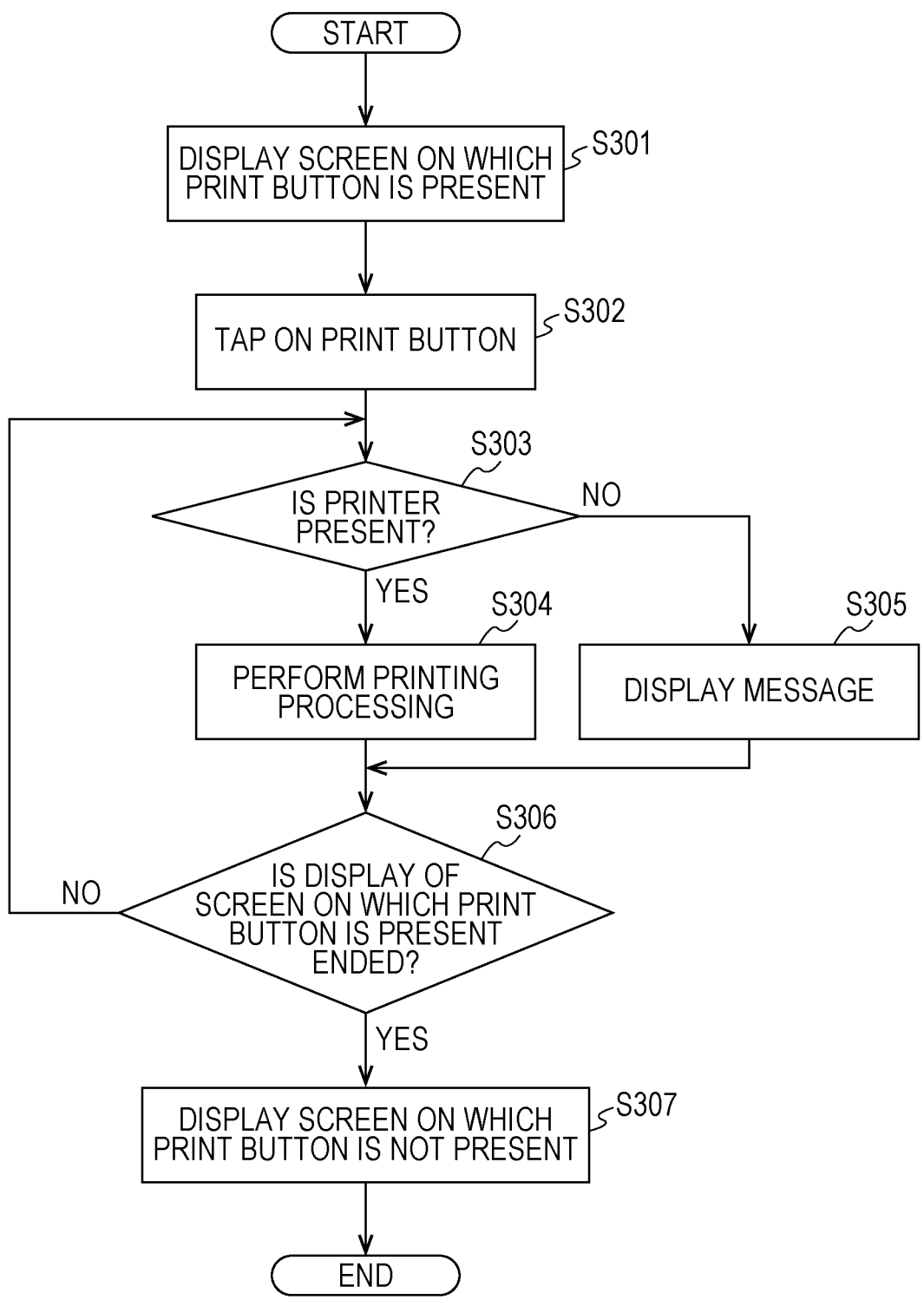
FIG. 14 is a flowchart for describing display processing according to the second embodiment.

FIG. 14 is a flowchart for describing the display processing associated with the display of the screen for an instruction for performing a job. When the processing is started, the processing unit 110 first recognizes the operation of causing transitioning to the screen for an instruction for performing a job, and performs processing that displays the screen for an instruction for performing a job that is the usual screen for an instruction for performing a job (S301).

When, with the screen for an instruction for performing printing, the operation on the print button is detected (S302), the processing unit 110 determines whether or not the designation electronic apparatus is present (S303). In a case where the designation electronic apparatus is present, the processing unit 110 performs a printing job (S304). In the case where the designation electronic apparatus is not present, the screen for the absence, which is illustrated in FIG. 13, is displayed (S305). That is, a message is displayed and thus the user is urged to take a corrective action.

The processing unit 110 determines whether or not the display of the screen that includes the print button is ended (S306). In a case where the result of the determination is Yes, processing that displays the home screen or the like (S307), and in a case where the result of the determination is No, processing that returns to S303 continues.

It is noted that the message which is displayed on the screen for the absence according to the present embodiment is not limited to the message that notifies the absence. The screen for the absence may be a message screen that notifies the presence of any other electronic apparatus that possibly performs a job.

As illustrated in FIG. 7, a capability of the electronic apparatus 200 is stored in the storage unit 160 of the terminal apparatus 100. By using the capability, it is possible that unsuitable print data is suppressed from being created. For example, in a case where the electronic apparatus 200 that supports only an A4 paper sheet size or smaller is the designation electronic apparatus, the processing unit 110 prevents creation of print data with resolution that corresponds to a paper sheet size larger than the A4 paper sheet size. Alternatively, in a case where the electronic apparatus 200 that does not correspond to the CD label printing is the designation electronic apparatus, the processing unit 110 prevents creation of print data that is formed into the shape of a CD label. Specifically, the processing unit 110 performs processing in such a manner that a specific panel is not displayed on the home screen that is illustrated in A1 of FIG. 4, or that a specific paper sheet size or printing mode cannot be selected on a setting screen that is not illustrated.

By using the capability information, the electronic apparatus 200 that possibly supports the created print data can be specified. In the case of an example in FIG. 7, it can be determined whether or not the printer 2, the printer 4, and the printer 5 that are not the designation electronic apparatuses can take over a job of printing print data, which is to be performed by the printer 1 that is the designation electronic apparatus. Furthermore, the terminal apparatus 100 also receives the BLE beacon signal from the electronic apparatus 200 other than the designation electronic apparatus. For this reason, it is possible that the processing unit 110 determines the presence or absence of the electronic apparatus 200 other than the designation electronic apparatus. In the case of an example in FIG. 8, it can be determined that the printer 2 and the printer 4 are present and the printer 5 is not present.

That is, the processing unit 110 possibly supports the created print data, and can specify the electronic apparatus 200 of which the presence is ensured. For example, it is determined that the print data which is created by the printer 1 is possibly printed in the printer 2 and that the printer 2 is present. In this case, the user sets the printer 2 as the designation electronic apparatus and thus it is possible that the print data is smoothly printed.

Figure 15:
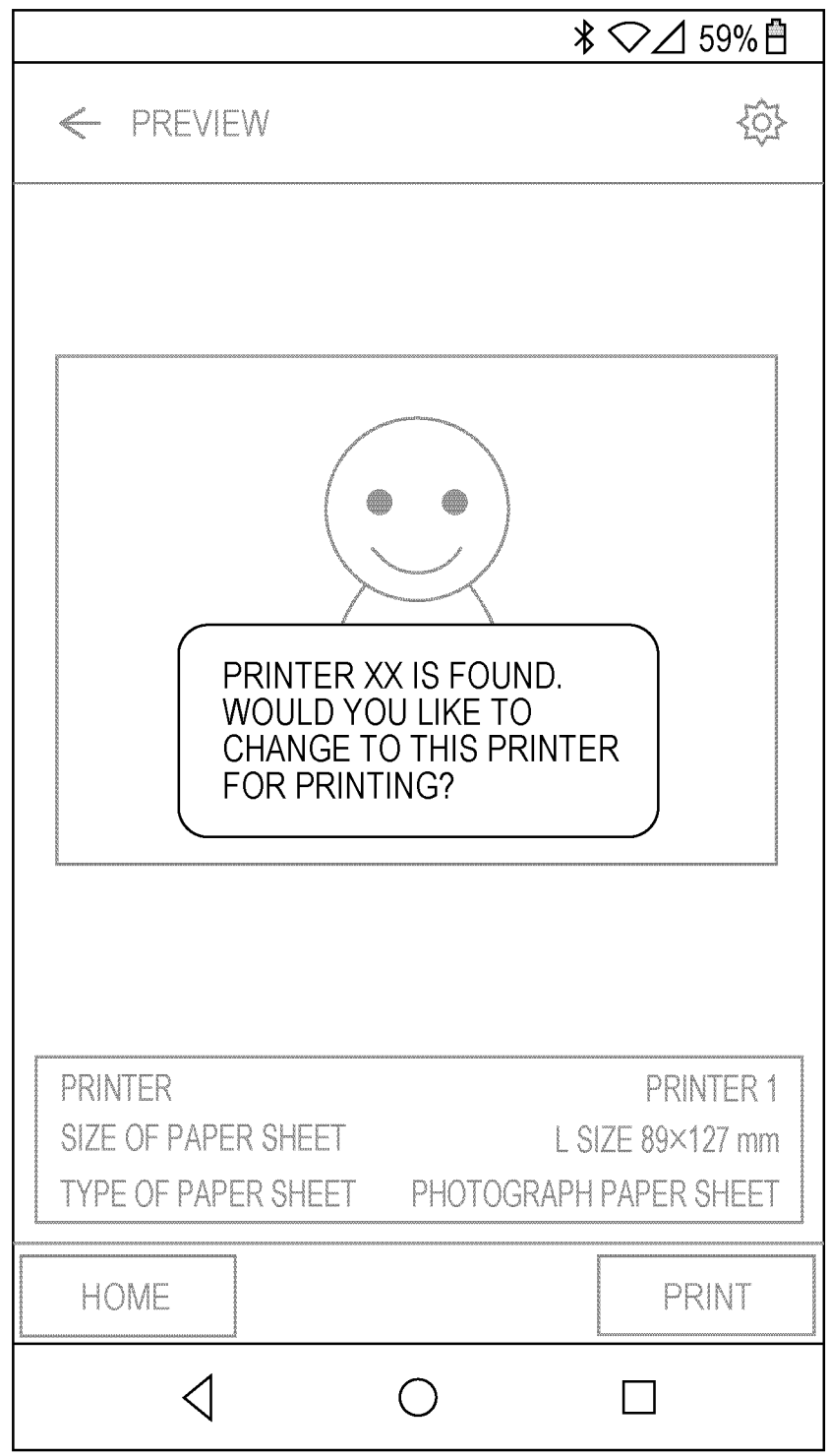
FIG. 15 is a diagram illustrating another example of the screen for the absence according to the second embodiment.

FIG. 15 illustrates another example of the screen for the absence according to the present embodiment. As illustrated in FIG. 15, the message "PRINTER XX IS FOUND. WOULD YOU LIKE TO CHANGE TO THIS PRINTER FOR PRINTING?" is displayed on a pop-up format on the screen for an instruction for performing printing in FIG. 5. In the case of the example described above, the printer XX is the printer 2. In a case where multiple printers satisfy a condition, the multiple printers may be displayed in such a manner as to be arranged side by side, and one printer may be selected from among the multiple printers for display. With this message, substitute apparatuses that possibly suitably print the print data can be presented. Because of this, the user does not need to wait for a long time and an improvement in convenience is possible.

3. Modification Example

Several modification examples will be described below.

3.1 Status

As illustrated in FIG. 9, based on the beacon signal in compliance with the second wireless communication scheme, the processing unit 110 can receive status information on the designation electronic apparatus. Based on the status information, the processing unit 110 performs processing that displays a screen which notifies that the designation electronic apparatus is in a given status, on the display unit 130.

The screen which notifies that the designation electronic apparatus is in the given status, for example, is the maintenance screen that is illustrated in A2 of FIG. 4, and the status is displayed on A22. If this is done, it is possible that the status of the designation electronic apparatus is notified to the user.

The given status here is a status of at least one of an error status and a status of a job that waits to be performed. The error status corresponds to the error status described above, and the status of a job that waits to be performed corresponds to the operating status described above. That is, the user can be notified that, although a new job is input, there is a likelihood that it takes time to perform the new job, or that, if the user does not take a corrective action, the new job cannot be suitably performed. As a result, it is possible that the designation electronic apparatus is reselected or that the user is urged to take a corrective action, such as replacement of ink with new one in the designation electronic apparatus.

However, a screen on which the status information is displayed is not limited to the maintenance screen. For example, a message that notifies a status may be displayed on a screen for printing in progress (not illustrated) or the screen for an instruction for performing printing. If this is done, it is possible that, while printing is in progress, or before printing is performed, the user is notified that a problem appears in a status of the electronic apparatus 200.

Alternatively, in addition to the presence or absence of the designation electronic apparatus, the status of the designation electronic apparatus may be determined. Specifically, in a case where the designation electronic apparatus is present and is in the idle status, the print button is enabled (S203), or printing processing (S304) is performed. On the other hand, the print button is disabled (S204), or message display (S305) is performed, in a case where at least one of three conditions, a condition that the designation electronic apparatus is not present, a condition that the designation electronic apparatus is in the error status, and a condition that the designation electronic apparatus is in the operating status is satisfied. In this case, in a case where the designation electronic apparatus is in a given status, in the first place, printing is not allowed to be performed.

3.2 Program and System

Furthermore, a target in which the technique according to the present embodiment finds application is not limited to the terminal apparatus 100 that has been described above.

The technique according to the present embodiment, as illustrated in FIG. 1, can find application in the communication system 10 that includes the terminal apparatus 100 and the electronic apparatus 200, which are described above. The communication system 10, as illustrated in FIG. 6, may include multiple electronic apparatuses 200.

Furthermore, one or several of, or most of the processing operations by the terminal apparatus 100 or the electronic apparatus 200 according to the present embodiment may be realized by a program. In this case, a CPU or the like executes the program, and thus the terminal apparatus 100 and the like according to the present embodiment are realized. Specifically, the program that is stored on a non-volatile information storage medium is read and the processor such as the CPU executes the program that is read. The information storage medium here is a computer-readable recording medium. A program, data, and the like are stored in the information storage medium. A function of the information storage medium can be realized by an optical disk, such as a DVD or a CD, an HDD, a memory, or the like. Then, the processor such as the CPU performs various processing operations according to the present embodiment based on the program that is stored in the information storage medium. That is, a program that causes a computer to function as each unit according to the present embodiment is stored in the information storage medium.

Furthermore, the technique according to the present embodiment can find application in a display control method that performs one or several of, or all of the processes that are illustrated in FIGS. 11, 12, and 14, a communication control method, a method of controlling the terminal apparatus 100, or a method of operating the terminal apparatus 100. In a display control method according to the present embodiment, which is a display control method in a terminal apparatus 100 that includes a first wireless communication unit 121 which performs wireless communication with an electronic apparatus 200 using a first wireless communication scheme, and a second wireless communication unit 122 which performs the wireless communication with the electronic apparatus 200 using a second wireless communication scheme that is different from the first wireless communication scheme, it is determined whether or not a designation electronic apparatus that is a target that performs a job in compliance with the first wireless communication scheme is present, based on a result of the wireless communication in compliance with the second wireless communication scheme, and, in a case where the designation electronic apparatus is not present, processing that displays a screen for the absence on a display unit is performed.

The embodiments and the modification examples thereof in which the invention finds application are described above, but the invention is not limited to the embodiments and the modification examples thereof as are. At stages of implementation, a constituent element can be modified and thus a modification thereto can be realized within the scope that does not depart from the gist of the invention. Furthermore, various inventions can be conceived and be reduced to practice by suitably combining the multiple constituent elements that are disclosed in each of the embodiments or each of the modification examples thereof, which are described above. For example, of all constituent elements that are described in each of the embodiments or each of the modification examples thereof, several constituent elements may be deleted. Moreover, the constituent elements that are described in the different embodiments or the different modification examples thereof may be suitably combined. Furthermore, in the specification or the drawings, a term that is described at least once together with a different term that has a broader meaning or the same meaning can be replaced with the different term, throughout the specification or the drawings. In this manner, various modifications or applications are possible within the scope that does not depart from the gist of the invention.

The entire disclosure of Japanese Patent Application No. 2018-032857, filed Feb. 27, 2018 is expressly incorporated by reference herein.

What is claimed is:

1. A terminal apparatus comprising:
   a first wireless communication interface that performs wireless communication with an electronic apparatus using a first wireless communication scheme;
   a second wireless communication interface that performs wireless communication with the electronic apparatus using a second wireless communication scheme that is different from the first wireless communication scheme; and
   a processor that performs communication control of the first wireless communication interface and the second wireless communication interface,
   wherein the processor determines whether or not a designation electronic apparatus that is a target which performs a job in compliance with the first wireless communication scheme is present, based on a result of the wireless communication with the designation electronic apparatus in compliance with the second wireless communication scheme, and, in a case where the designation electronic apparatus is not present, performs processing that displays a screen for the absence, on a display.

2. The terminal apparatus according to claim 1,
   wherein, in a case where the designation electronic apparatus is present, the processor performs processing that displays a screen for an instruction for performing a job, on the display and
   wherein, in the case where the designation electronic apparatus is not present, the processor performs processing that displays the screen for the absence on the display, instead of the screen for an instruction for performing a job.

3. The terminal apparatus according to claim 2,
   wherein an object for performing a job is displayed on the screen for an instruction for performing a job, and
   wherein the screen for the absence is a screen that results from changing a mode for displaying the object on the screen for an instruction for performing a job.

4. The terminal apparatus according to claim 1,
   wherein, in a case where an operation of performing a job is detected, if the designation electronic apparatus is present, the processor instructs the designation electronic apparatus to perform a job, using the first wireless communication scheme, and
   wherein, in the case where the operation of performing a job is detected, if the designation electronic apparatus is not present, the processor performs processing that displays the screen for the absence on the display.

5. The terminal apparatus according to claim 4,
   wherein the screen for the absence is a message screen that notifies the absence of the designation electronic apparatus.

6. The terminal apparatus according to claim 4,
   wherein the screen for the absence is a message screen that notifies the presence of any other electronic apparatus that possibly performs a job.

7. The terminal apparatus according to claim 1,
   wherein, based on a beacon signal in compliance with the second wireless communication scheme, the processor determines whether or not the designation electronic apparatus is present.

8. The terminal apparatus according to claim 7,
wherein the processor determines whether or not the designation electronic apparatus is present, based on a result of processing that compares identification information on the designation electronic apparatus, which is acquired using the first wireless communication scheme, and identification information that is included in the beacon signal in compliance with the second wireless communication scheme.

9. The terminal apparatus according to claim 7,
wherein the processor receives status information on the designation electronic apparatus based on the beacon signal in compliance with the second wireless communication scheme, and performs processing that displays a screen which notifies that the designation electronic apparatus is in a given status, on the display, based on the status information.

10. The terminal apparatus according to claim 9,
wherein the given status is at least one status of an error status and a status of a job that waits to be performed.

11. A communication system comprising:
the terminal apparatus according to claim 1; and
the electronic apparatus.

12. A non-transitory computer-readable recording medium on which a program is recorded, the program causing a computer to function as:
a first wireless communication interface that performs wireless communication with an electronic apparatus using a first wireless communication scheme;
a second wireless communication interface that performs wireless communication with the electronic apparatus using a second wireless communication scheme that is different from the first wireless communication scheme; and
a processor that performs communication control of the first wireless communication interface and the second wireless communication interface,
wherein the processor determines whether or not a designation electronic apparatus that is a target which performs a job in compliance with the first wireless communication scheme is present, based on a result of the wireless communication with the designation electronic apparatus in compliance with the second wireless communication scheme, and, in a case where the designation electronic apparatus is not present, performs processing that displays a screen for the absence, on a display.

13. A display control method in a terminal apparatus that includes a first wireless communication interface which performs wireless communication with an electronic apparatus using a first wireless communication scheme, and a second wireless communication interface which performs wireless communication with the electronic apparatus using a second wireless communication scheme that is different from the first wireless communication scheme, the method comprising:
determining whether or not a designation electronic apparatus that is a target that performs a job in compliance with the first wireless communication scheme is present, based on a result of the wireless communication in compliance with the second wireless communication scheme; and
performing processing that displays a screen for the absence on a display, in a case where the designation electronic apparatus is not present.

* * * * *